(12) United States Patent
Maezawa

(10) Patent No.: US 12,019,226 B2
(45) Date of Patent: Jun. 25, 2024

(54) OPTICAL SYSTEM AND IMAGING APPARATUS INCLUDING OPTICAL SYSTEM

(71) Applicant: CANON KABUSHIKI KAISHA, Tokyo (JP)

(72) Inventor: Koji Maezawa, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 856 days.

(21) Appl. No.: 17/092,117

(22) Filed: Nov. 6, 2020

(65) Prior Publication Data

US 2021/0157111 A1 May 27, 2021

(30) Foreign Application Priority Data

Nov. 21, 2019 (JP) .................. 2019-210888

(51) Int. Cl.
| | | |
|---|---|---|
| *G02B 17/08* | (2006.01) | |
| *B60K 28/00* | (2006.01) | |
| *B60Q 9/00* | (2006.01) | |
| *G02B 5/10* | (2006.01) | |
| *G06K 9/00* | (2022.01) | |
| *G06V 20/58* | (2022.01) | |

(52) U.S. Cl.
CPC .......... *G02B 17/0808* (2013.01); *B60K 28/00* (2013.01); *B60Q 9/008* (2013.01); *G02B 5/10* (2013.01); *G06V 20/58* (2022.01)

(58) Field of Classification Search
CPC ............ G02B 17/0808; G02B 17/0824; G06V 20/58; B60K 28/00; B60Q 9/008

USPC ............................................. 359/728, 727
See application file for complete search history.

(56) References Cited

U.S. PATENT DOCUMENTS

| 2012/0121136 A1* | 5/2012 | Gloger | ..................... | B60R 1/00 |
| | | | | 382/104 |
| 2013/0027603 A1* | 1/2013 | Maezawa | ............... | G02B 21/04 |
| | | | | 348/335 |
| 2015/0355441 A1* | 12/2015 | Kim | ....................... | G02B 21/04 |
| | | | | 359/729 |

(Continued)

FOREIGN PATENT DOCUMENTS

| JP | 08-166542 A | 6/1996 |
| JP | 08166542 A * | 6/1996 |
| JP | 2003215458 A | 7/2003 |

(Continued)

*Primary Examiner* — Stephone B Allen
*Assistant Examiner* — Leonidas Boutsikaris
(74) *Attorney, Agent, or Firm* — CANON U.S.A., INC. IP Division

(57) ABSTRACT

An optical system includes a first optical element including a first reflective area having a convex shape toward a magnification side, a second optical element including a second reflective area having a convex shape toward the magnification side, and a light shielding member disposed between the first optical element and the second optical element. Light from the magnification side travels to a reduction side through the second reflective area, the first reflective area, and a refractive area of the second optical element in order. The light shielding member is disposed between light entering the second reflective area and light entering the first reflective area in a first cross-section including an optical axis.

20 Claims, 14 Drawing Sheets

(56) References Cited

U.S. PATENT DOCUMENTS

2019/0033566 A1* 1/2019 Maezawa ............ G02B 17/0808
2023/0005374 A1* 1/2023 Elimaleh .............. G06V 20/588

FOREIGN PATENT DOCUMENTS

| JP | 2019-045722 A | 3/2019 |
| JP | 2019-101181 A | 6/2019 |

* cited by examiner

G2R1

G2R2

OPTICAL SYSTEM AND IMAGING APPARATUS INCLUDING OPTICAL SYSTEM

BACKGROUND OF THE DISCLOSURE

Field of the Disclosure

The aspect of the embodiments relates to an optical system including a refractive surface and a reflective surface, and is suitable for an imaging apparatus such as a digital still camera, a digital video camera, an on-vehicle camera, a mobile phone camera, a monitoring camera, a wearable camera, or a medical camera.

Description of the Related Art

A catadioptric system that uses a reflective surface and a refractive surface to realize downsizing has been well-known. Japanese Patent Application Laid-Open No. 2003-215458 discusses a catadioptric system that consists of a catadioptric element including a reflective surface and a refractive surface and a reflective element including a reflective surface.

In an imaging apparatus using the catadioptric system, unnecessary light (stray light) enters an imaging surface without through reflective surfaces, which may cause ghost in an acquired image. In the technology discussed in Japanese Patent Application Laid-Open No. 2003-215458, however, the stray light is not considered at all.

SUMMARY OF THE DISCLOSURE

According to an aspect of the embodiments, an optical system includes a first optical element including a first reflective area having a convex shape toward a magnification side, a second optical element including a second reflective area having a convex shape toward the magnification side, and a light shielding member disposed between the first optical element and the second optical element. Light from the magnification side travels to a reduction side through the second reflective area, the first reflective area, and a refractive area of the second optical element in order. The light shielding member is disposed between light entering the second reflective area and light entering the first reflective area in a first cross-section including an optical axis.

Further features of the disclosure will become apparent from the following description of exemplary embodiments with reference to the attached drawings.

DESCRIPTION OF THE EMBODIMENTS

Figure 1:
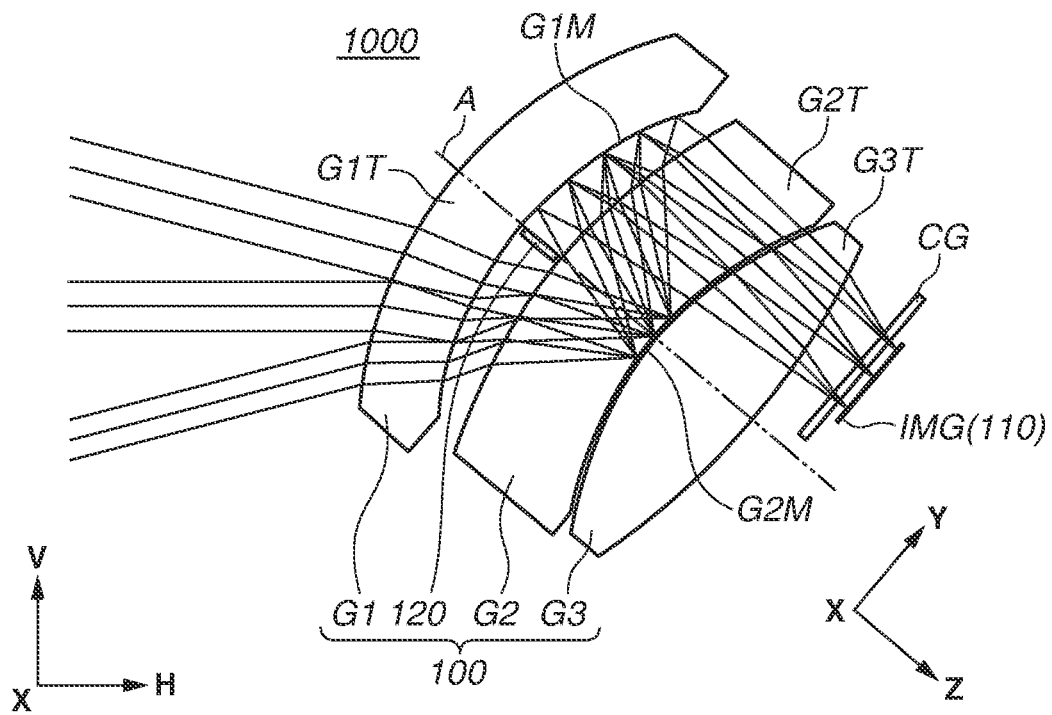
FIG. 1 is a schematic diagram illustrating a main part of an imaging apparatus according to a first exemplary embodiment.
Figure 1:
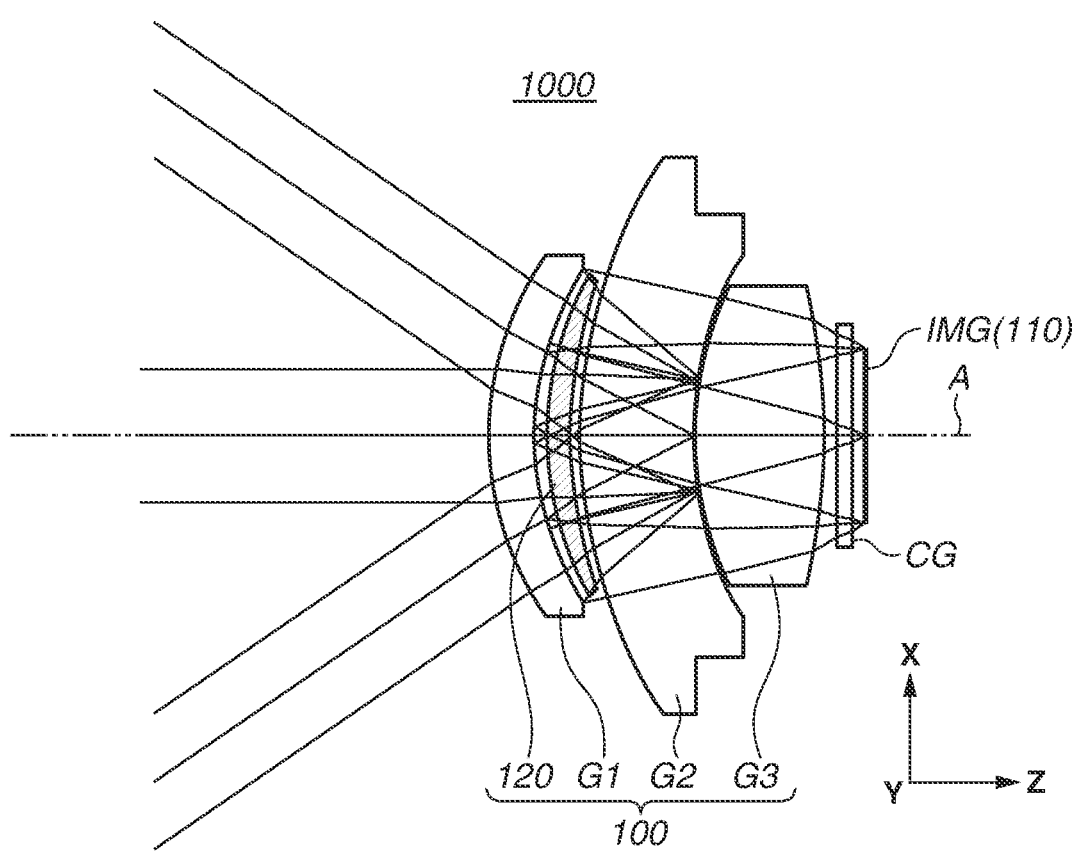

Some exemplary embodiments of the disclosure are described below with reference to drawings. The drawings may be in sizes different from the actual sizes for convenience. Further, in the drawings, the same members are denoted by the same reference numerals, and repetitive descriptions are omitted. In the exemplary embodiments, an "optical surface" indicates a refractive surface and a reflective surface, an "optical axis" indicates an axis passing through a center (surface vertex) of each of optical surfaces in an optical system, and an "interval" indicates a surface interval on the optical axis.

FIG. 1 is a schematic diagram illustrating a main part in a YZ cross-section (first cross-section) including an optical axis A of an imaging apparatus 1000 according to an exemplary embodiment of the disclosure, and a schematic diagram illustrating a main part of the imaging apparatus 1000 as viewed from a Y direction. The imaging apparatus 1000 includes an optical system 100 and an imaging element 110 that images an object through the optical system 100. In FIG. 1, in a horizontal direction (H direction), a left side (−H side) is a magnification side (object side), and a right side (+H side) is a reduction side (image side). Further, in the schematic diagram illustrating the main part as viewed from the Y direction, a light flux traveling toward a center of an image height in the Y direction is illustrated.

The optical system 100 according to the present exemplary embodiment is an image-forming optical system (imaging optical system) that condenses a light flux from an object (not illustrated) to form an image of the object. The optical system 100 is a catadioptric system that includes a first optical element G1 and a second optical element G2. The first optical element G1 includes a first reflective area G1M having a convex shape toward the magnification side. The second optical element G2 includes a second reflective area G2M having a convex shape toward the magnification side. The light from the magnification side travels toward the reduction side through the second reflective area G2M, the first reflective area G1M, and a refractive area G2T of the second optical element G2 in order, and forms an image plane IMG.

At a position of the image plane IMG, an imaging surface of the imaging element 110 that performs photoelectric conversion of the image formed by the optical system 100 is disposed. FIG. 1 illustrates a light receiving surface that receives an effective light flux contributing to image formation of the object in the imaging surface of the imaging element 110. As the imaging element 110, a solid-state imaging element such as a charge-coupled device (CCD) sensor or a complementary metal-oxide semiconductor (CMOS) sensor can be adopted.

As described above, the optical system 100 folds the optical path by the first reflective area G1M serving as a reflective surface (concave reflective surface) having positive power and the second reflective area G2M serving as a reflective surface (convex reflective surface) having negative power. This makes it possible to prevent occurrence of aberrations while realizing downsizing of the entire system. At this time, arrangement of the first reflective area G1M and the second reflective area G2M is similar to arrangement of a Schwarzschild optical system. Therefore, it is possible to realize a bright optical system having a small aperture value (F-number).

Further, the light receiving surface of the imaging element 110 according to the present exemplary embodiment is disposed on one side (+Y side) of the optical axis A in the YZ cross-section (first cross-section) including the optical axis A. In other words, the light receiving surface of the imaging element 110 is disposed so as not to receive an on-axis light flux condensed on the optical axis A among the light fluxes from the optical system 100, and so as to receive an off-axis light flux that enters the optical system 100 from a side (−Y side) opposite to the light receiving surface side with respect to the optical axis A. As a result, the imaging element 110 can be disposed so as not to interfere with the optical system 100 and the optical path of the optical system 100 while the optical path is folded by the reflective surfaces to realize downsizing.

As described above, in the imaging apparatus including the catadioptric system, ghost generated when unnecessary light enters the imaging surface without through the reflective surfaces becomes an issue. The ghost at this time indicates a high-luminance component generated in the acquired image when the unnecessary light enters the light receiving surface of the imaging element 110 without through the reflective surfaces.

Therefore, in the present exemplary embodiment, a light shielding member 120 is disposed between the first optical element G1 and the second optical element G2 in the optical axis direction and between light entering the second reflective area G2M and light entering the first reflective area G1M of the first cross-section. As illustrated in FIG. 1, the light shielding member 120 includes light shielding surfaces facing the −Y side and the +Y side. As a result, it is possible to excellently shield the unnecessary light, for example, light that enters the optical system 100 from the −Y side and directly travels toward the image plane IMG without through the second reflective area G2M, without shielding the effective light flux.

A position of the light shielding member 120 in the Y direction is determined based on the configuration of the optical system 100 (optical path of the effective light flux). The light shielding member 120 according to the present exemplary embodiment is disposed at a position facing the second reflective area G2M in the optical axis direction, on the −Y side of the first reflective area G1M. Although the light shielding member 120 according to the present exemplary embodiment is disposed separately from the first optical element G1 and the second optical element G2 in the optical axis direction, the light shielding member 120 may be disposed in contact with the optical elements as necessary.

Figure 2:
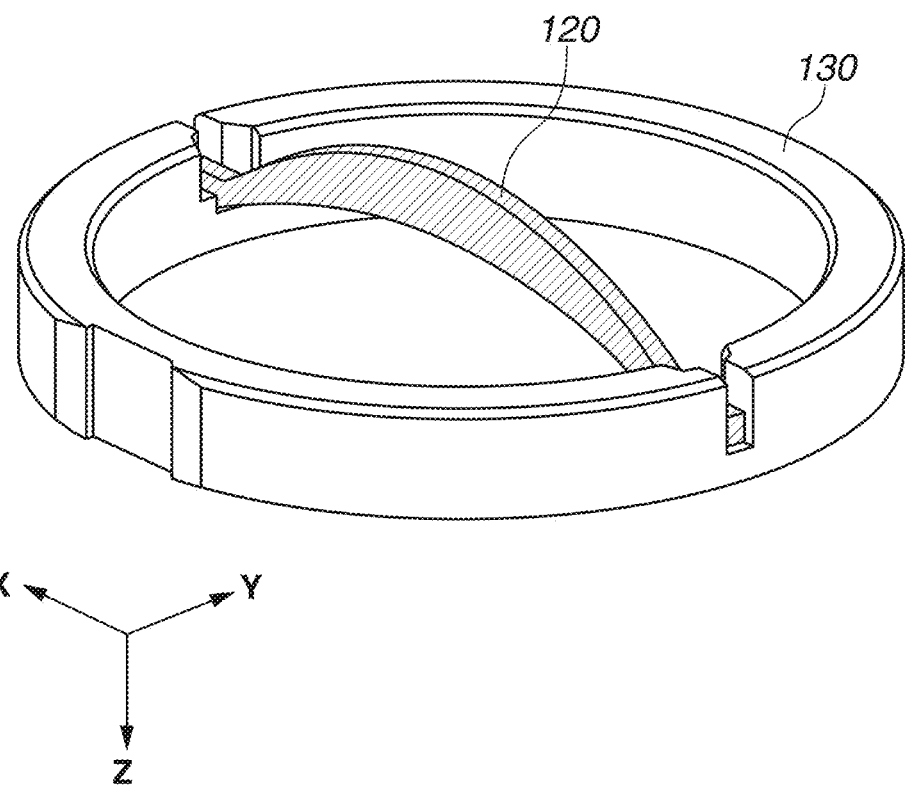
FIG. 2 is a schematic diagram illustrating a main part of a light shielding member according to the first exemplary embodiment.

FIG. 2 is a schematic diagram (perspective view) illustrating a main part of the light shielding member 120 according to the present exemplary embodiment. As illustrated in FIG. 2, when viewed from a direction (Y direction) perpendicular to the optical axis A, the light shielding member 120 has a shape corresponding to a shape of a reduction-side surface of the first optical element G1 and a shape of a magnification-side surface of the second optical element G2. This makes it possible to reduce an interval between each of the optical elements and the light shielding member 120 as much as possible, and to shield the unnecessary light more excellently. The light shielding member 120 according to the present exemplary embodiment has a meniscus shape in which a radius of curvature at an end on the reduction side (+Z side) is larger than a radius of curvature at an end on the magnification side (−Z side).

Further, as illustrated in FIG. 2, a holding member 130 holding the light shielding member 120 is adopted. Fixing the holding member 130 to the other member of the imaging apparatus 1000 makes it possible to position the light shielding member 120. At this time, bringing the holding member 130 into contact with the reduction-side surface of the first optical element G1 and the magnification-side surface of the second optical element G2 may cause the holding member 130 to have a function as a spacer that maintains the interval between the first optical element G1 and the second optical element G2. The holding member 130 according to the present exemplary embodiment has an annular shape that does not shield light of an effective area (area which the effective light flux enters) of each of the optical elements when viewed from the optical axis direction. The shape of the holding member 130, however, is not limited to the annular shape as long as the shape does not shield the effective light flux (the holding member 130 is located outside the effective area of each of optical elements when viewed from the optical axis direction).

Further, a light shielding area G2S is provided in a non-effective area other than the effective area (refractive area G2T and second reflective area G2M) of the second optical element G2. This makes it possible to prevent occurrence of unnecessary light that is reflected (diffused) by the non-effective area of the second optical element G2 and reaches the image plane IMG. It is sufficient to provide the light shielding area G2S on at least one of the magnification-side surface and the reduction-side surface of the second optical element G2; however, to more excellently shield the unnecessary light without shielding light of the effective area, in one embodiment, the light shielding area G2S is provided on the reduction-side surface including the second reflective area G2M. In another embodiment, the light shielding area G2S is provided on both of the magnification-side surface and the reduction-side surface.

Figure 3:
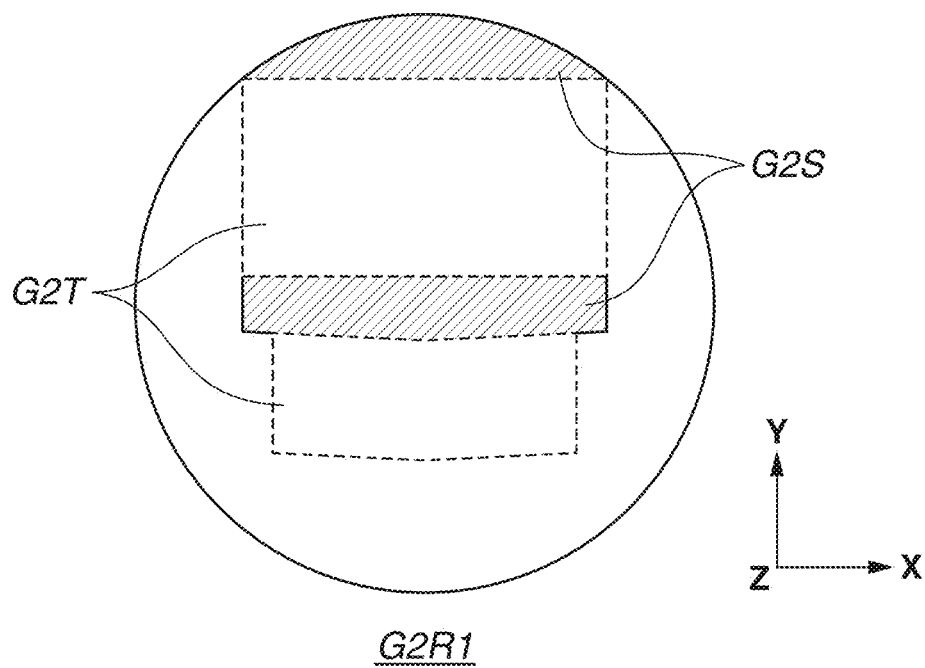
FIG. 3 is a schematic diagram illustrating a main part of a light shielding area according to the first exemplary embodiment.
Figure 3:
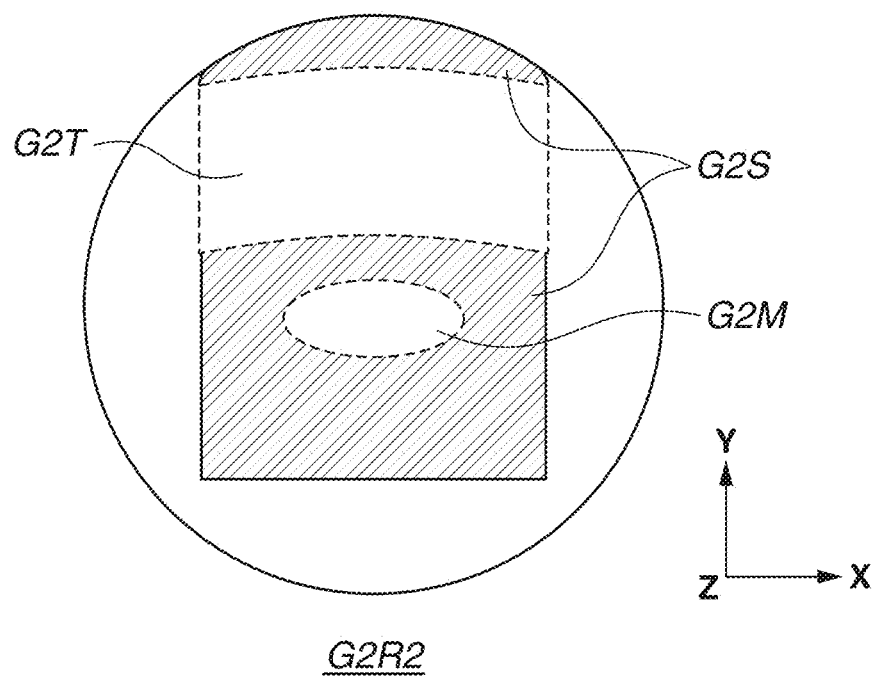

FIG. 3 is a schematic diagram illustrating a main part of each of the optical surfaces of the second optical element G2 as viewed from the magnification side. An upper diagram of FIG. 3 illustrates a magnification-side surface G2R1 of the second optical element G2, and a lower diagram of FIG. 3 illustrates a reduction-side surface G2R2 of the second optical element G2. In FIG. 3, the effective area in each of the optical surfaces is illustrated by a dashed line. In the present exemplary embodiment, as illustrated in FIG. 3, the light shielding area G2S is provided in the non-effective area (other than the second reflective area and other than the second refractive area) in both of the magnification-side surface G2R1 and the reduction-side surface G2R2. This makes it possible to excellently shield the unnecessary light entering the non-effective area. The light shielding area G2S can be formed by, for example, applying a light shielding paint on each of the optical surfaces or providing a light shielding film on each of the optical surfaces by vapor deposition or other methods.

Further, the following inequality (1) is satisfied:

$$1.5 \leq L2/L1 \leq 6.5 \quad (1)$$

where L1 is an interval between an optical surface including the first reflective area G1M and an optical surface including the second reflective area G2M, and L2 is an interval between the optical surface including the first reflective area G1M and the light receiving surface of the imaging element 110.

In the case where the optical system 100 is applied to the imaging apparatus, satisfying the inequality (1) makes it possible to prevent occurrence of ghost while preventing increase in the entire length of the optical system 100. When becoming lower than a lower limit of the inequality (1), the interval between the optical surface including the first reflective area G1M and the light receiving surface of the imaging element 110 becomes excessively small, and the unnecessary light easily reaches the light receiving surface of the imaging element 110. In contrast, when becoming larger than an upper limit of the inequality (1), the interval between the optical surface including the first reflective area G1M and the light receiving surface of the imaging element 110 becomes excessively large, and it is difficult to reduce the entire length of the optical system 100. Further, the following inequalities (1a) and (1b) are satisfied in order:

$$1.6 \leq L2/L1 \leq 4.0, \quad (1a)$$

$$1.7 \leq L2/L1 \leq 3.0. \quad (1b)$$

Furthermore, the following inequality (2) is satisfied:

$$1.3 \leq |R1/L1| \leq 4.0 \quad (2)$$

where R1 is a radius of curvature of the optical surface including the first reflective area G1M.

Satisfying the inequality (2) makes it possible to excellently correct curvature of field while avoiding interference between the imaging element 110 and each of the optical paths. When becoming lower than a lower limit of the inequality (2), the imaging element 110 may interfere with each of the optical paths. In contrast, when becoming larger than an upper limit of the inequality (2), correction of the curvature of field is insufficient and it is difficult to obtain excellent image forming performance. In one embodiment, the following inequalities (2a) and (2b) are satisfied in order:

$$1.5 \leq |R1/L1| \leq 3.0, \quad (2a)$$

$$1.6 \leq |R1/L1| \leq 2.5. \quad (2b)$$

Further, when the entire length of the optical system 100 is La and a focal length of the (entire) optical system 100 is f, the following inequality (3) is satisfied. At this time, the entire length of the optical system 100 according to the present exemplary embodiment indicates an interval between the optical surface farthest from the image plane IMG and the image plane IMG in the optical axis direction (Z direction). In other words, in the present exemplary embodiment, an interval between the magnification-side surface of the first optical element G1 and the image plane IMG corresponds to the entire length of the optical system 100.

$$La/f \leq 3.0 \quad (3)$$

When the entire length normalized by the focal length of the optical system 100 is reduced to satisfy the inequality (3), it is possible to realize downsizing of the entire system. In one embodiment, the following inequalities (3a) and (3b) are satisfied in order.

$$La/f \leq 2.8 \quad (3a)$$

$$La/f \leq 2.7 \quad (3b)$$

The imaging apparatus 1000 according to a first exemplary embodiment of the disclosure is described below. The imaging apparatus 1000 according to the present exemplary embodiment has a configuration similar to the configuration of the imaging apparatus 1000 according to the above-described exemplary embodiment. Therefore, repetitive descriptions are omitted.

The optical system 100 according to the present exemplary embodiment includes the first optical element G1, the second optical element G2, and a third optical element G3. The first optical element G1 includes a refractive area G1T having positive power. The second optical element G2 includes a refractive area G2T having negative power. The third optical element G3 includes a refractive area G3T having positive power. Further, the second reflective area G2M provided on the image-side surface of the second optical element G2 functions as an aperture stop. This configuration makes it possible to secure symmetry of power arrangement of the refractive areas in front of and behind the aperture stop, and to excellently correct various aberrations such as magnification chromatic aberration.

More specifically, the first optical element G1 according to the present exemplary embodiment is a positive meniscus lens in which the object-side surface and the image-side surface each have a convex shape toward the object side, and is a catadioptric element (catadioptric lens) having the refractive area G1T and the first reflective area G1M. The first reflective area G1M according to the present exemplary embodiment is a front surface mirror provided on the image-side surface of the first optical element G1; however, the first reflective area G1M may be a rear surface mirror provided on the object-side surface of the first optical element G1. To realize the symmetry of the number of refraction times of light in front of and behind the aperture stop described below to correct various aberrations such as magnification chromatic aberration, in one embodiment, the first reflective area G1M is a front surface mirror.

The second optical element G2 according to the present exemplary embodiment is a negative meniscus lens in which the object-side surface and the image-side surface each have a convex shape toward the object side, and is a catadioptric element having the refractive area G2T and the second reflective area G2M. Further, the third optical element G3 according to the present exemplary embodiment is a biconvex lens having positive power, and is a refractive element (refractive lens) having no reflective area. The shape of each of the first optical element G1, the second optical element G2, and the third optical element G3 is not limited to the shape illustrated in FIG. 1, and is appropriately changeable, as necessary.

As described above, in the optical system 100 according to the present exemplary embodiment, the first optical element G1 and the second optical element G2 are the catadioptric elements. Therefore, it is possible to excellently correct aberration while preventing increase in the number of optical elements to downsize the entire system. Further, since the third optical element G3 according to the present exemplary embodiment includes the refractive area G3T having positive power, it is possible to excellently correct aberration such as comatic aberration occurred on the refractive surface on the image side of the second optical element G2. As a result, in the small configuration in which the first optical element G1 and the second optical element G2 are the catadioptric elements, it is possible to realize high image forming performance.

In addition, in the first optical element G1 according to the present exemplary embodiment, the first reflective area G1M is disposed on one side (+Y side) of the optical axis A. The reflective area in the present exemplary embodiment indicates an effective area that reflects the effective light contributing to the image formation in the optical element. In other words, even if the reflective surface is formed outside the effective area of the first optical element G1, the reflective surface is not included in the first reflective area G1M. According to the configuration, the optical paths are asymmetric about the optical axis A in the YZ cross-section as described above, which makes it possible to downsize the entire system while avoiding interference of the optical paths.

The second reflective area G2M according to the present exemplary embodiment functions as an aperture stop that reflects the effective light but shields other light. The second reflective area G2M consists of a reflective film (evaporated film) or the like, and the light shielding area G2S consists of a light absorbing member. The second reflective area G2M may be provided not on the image-side surface of the second optical element G2 but on the object-side surface of the third optical element G3. In this case, the second optical element G2 serve as a refractive element, and the third optical element G3 serve as a catadioptric element.

In a case where the second reflective area G2M is provided on the object-side surface of the third optical element G3, however, aberration may occur when the light is emitted from the image-side surface of the second optical element G2. Accordingly, as in the present exemplary embodiment, the second reflective area G2M is provided on the image-side surface of the second optical element G2. Further, in the case where the second reflective area G2M is provided on the object side surface of the third optical element G3, the image-side surface of the second optical element G2 and the object-side surface of the third optical element G3 are joined to each other, or each of the image-side surface of the second optical element G2 and the object-side surface of the third optical element G3 is formed as an aspherical surface to prevent occurrence of the above-described aberration.

Further, in the case where the second reflective area G2M is provided on the object-side surface of the third optical element G3 in place of the image-side surface of the second optical element G2, the configuration may be considered such that the second optical element G2 according to the above-described exemplary embodiment is replaced with the third optical element G3. In other words, the third optical element G3 according to the present exemplary embodiment is regarded as the second optical element G2 in the above-described exemplary embodiment. In this case, the light shielding area G2S is provided on the object-side surface of the third optical element G3 provided with the second reflective area G2M, and the light shielding area G2S is provided also on the image-side surface.

The light from the object (not illustrated) enters the object-side surface of the first optical element G1, passes through the refractive area G1T on the image-side surface of the first optical element G1 and the refractive area G2T on the object-side surface of the second optical element G2, and is reflected by the second reflective area G2M. At this time, part of the light is shielded by the light shielding area G2S. The light reflected by the second reflective area G2M passes through the object-side surface of the second optical element G2, and is reflected by the first reflective area G1M on the image-side surface of the first optical element G1.

The light reflected by the first reflective area G1M again enters the object-side surface of the second optical element G2, passes through the refractive area G2T of the second optical element G2 and the refractive area G3T of the third optical element G3, and forms the image plane IMG having a planar surface shape through an optical block CG. The optical block CG is an optical element not having power (not contributing to image formation), such as a cover glass or an optical filter.

As illustrated in FIG. 1, in the X direction, the optical system 100 has a shape symmetrical about the optical axis A, and the light from the object side enters the first optical element G1 from both sides of the optical axis A. In other words, in the ZX cross-section at each position in the Y direction, the optical system 100 has a shape symmetrical about the optical axis A. In contrast, also in the YZ cross-section illustrated in FIG. 1, the optical system 100 has a shape symmetrical about the optical axis A, but the light from the object side enters the first optical element G1 from the lower side (−Y side) of the optical axis A, and the image plane is formed on the upper side (+Y side) of the optical axis A. As described above, the optical system 100 has the configuration in which the light obliquely enters each of the optical surfaces in the YZ cross-section.

A field angle (horizontal field angle) in the ZX cross-section (second cross-section) including the optical axis A of the optical system 100 according to the present exemplary embodiment is 50°. When the +X side is positive and the −X side is negative with the optical axis A as a reference (0°), a range of an angle θx in the horizontal field angle is −25°≤θx≤+25°. Further, a field angle (vertical field angle) in the YZ cross-section including the optical axis A of the optical system 100 is 29°. When the +Y side is positive and the −Y side is negative with a center ray entering the object-side surface of the first optical element G1 as a reference (0°), a range of an angle θy in the vertical field angle is −14.5°≤θy≤+14.5°. An angle formed by the center ray and the optical axis A is 40°.

In the optical system 100 according to the present exemplary embodiment, the horizontal field angle is symmetrically set on both sides of the optical axis A, whereas the vertical field angle is set on the −Y side of the optical axis A. Further, in the optical system 100, the field angle in the YZ cross-section that includes the optical axis A and is perpendicular to the ZX cross-section is smaller than the field angle in the ZX cross-section including the optical axis A. In addition, the optical system 100 according to the present exemplary embodiment is a coaxial system in which surface vertices and curvature centers of all of the optical surfaces are present on the optical axis A, and is a rotationally symmetric system in which all of the optical surfaces each have a rotationally symmetric shape about the optical axis A. As described above, the optical system 100 is formed as the coaxial system and the rotationally symmetric system, which makes it possible to excellently correct various aberrations in each of the ZX cross-section and the YZ cross-section.

A lower area than the optical axis A on the object-side surface of the second optical element G2 has a convex shape toward the light entering from the object side. Therefore, the area largely refracts the light passing through a position separated from the optical axis A more than the light passing through a position near the optical axis A. Accordingly, angles of the light entering the lower area on the object-side surface of the second optical element G2 become nonuniform, and comatic aberration, magnification chromatic aberration, and distortion aberration occur. In contrast, an area above the optical axis A on the object-side surface of the second optical element G2 has a concave shape toward the light emitted to the first optical element G1. Therefore, the area largely refracts the light passing through the position separated from the optical axis A more than the light passing through the position near the optical axis A.

Since the second reflective area G2M is disposed in the optical path between the lower area and the upper area on the object-side surface of the second optical element G2, the arrangement of rays in the light flux (length of distance from optical axis A) is opposite between the time when the rays enter the lower area and the time when the rays are emitted from the upper area. Accordingly, the optical system 100 according to the present exemplary embodiment can cancel the comatic aberration, the magnification chromatic aberration, and the distortion aberration occurred in the lower area on the object-side surface of the second optical element G2, by the upper area on the object-side surface of the second optical element G2.

At this time, to generate a sufficient refractive index difference between the second optical element G2 and a medium that is provided between the first optical element G1 and the second optical eminent G2, the refractive index of the material is made small as much as possible. More specifically, the medium between the first optical element G1 and the second optical element G2 has a refractive index smaller than the refractive index of the second optical element G2, and particularly, the medium is air as in the present exemplary embodiment. As necessary, another medium (optical element) may be disposed between the first optical element G1 and the second optical element G2. In this case, a medium having a small refractive index such as air is disposed between the first optical element G1 and an optical element adjacent to the first optical element G1.

The second reflective area G2M according to the present exemplary embodiment is the reflective surface having the convex shape as described above, and has a function as the aperture stop. As described above, the second reflective area G2M having negative power functions as the aperture stop, which makes it possible to excellently correct spherical aberration while suppressing influence on curvature of field and astigmatism. In addition, when the second reflective area G2M has negative power, it is possible to appropriately secure an interval between the first reflective area G1M and the image plane IMG, and to easily avoid interference between the optical system 100 and the imaging element 110. In the present exemplary embodiment, the second reflective area G2M is formed as an aspherical surface having power that is gradually reduced as a distance from the optical axis A is increased, which makes it possible to correct spherical aberration more excellently.

Further, the second reflective area G2M according to the present exemplary embodiment has an elliptical shape. A long axis of the second reflective area G2M is parallel to the ZX cross-section, and a short axis is parallel to the YZ cross-section. In other words, a diameter of the second reflective area G2M in the X direction (first direction) that is perpendicular to the optical axis A and is parallel to the ZX cross-section is larger than a diameter in the Y direction (second direction) that is perpendicular to the optical axis A and the first direction. More specifically, an aperture value of the optical system 100 according to the present exemplary embodiment is F=1.2 in the X direction and F=3.0 in the Y direction.

In other words, the aperture value of the optical system 100 according to the present exemplary embodiment is set so as to be larger (darker) in the YZ cross-section on which the field angle of the optical system 100 is asymmetrical about the optical axis A than in the ZX cross-section on which the field angle of the optical system 100 is symmetrical about the optical axis A. As a result, the light flux width in the YZ cross-section is reduced to easily avoid optical path interference while improving brightness and resolution in the ZX cross-section. This makes it possible to improve flexibility in the arrangement of the optical surfaces. Note that the shape of the second reflective area G2M is not limited to the elliptical shape, and may be a rectangle or the like, as necessary.

The first reflective area G1M according to the present exemplary embodiment has a function mainly correcting curvature of field. Generally, to correct curvature of field in the optical system, optical design is performed so as to reduce a Petzval sum of the optical surfaces by cancel of the positive power and the negative power, and to bring a Petzval image plane close to a planar surface. In contrast, in the optical system 100 according to the present exemplary embodiment, curvature of field is corrected by appropriately setting a sagittal amount of the first reflective area G1M of the first optical element G1. This is described in detail below.

Since the optical system 100 according to the present exemplary embodiment has positive power as a whole, the Petzval image plane when an image is formed near the image plane tends to have a curved shape that is displaced on the object side as it goes from the optical axis A toward a peripheral part. In contrast, the first reflective area G1M has a concave shape, namely, a shape that is displaced on the image side as it goes from the optical axis A toward the peripheral part. Therefore, the interval between the first reflective area G1M and the image plane IMG is gradually reduced as it goes from the optical axis A toward the peripheral part.

Accordingly, curvature of field of the optical system 100 can be excellently corrected by an optical path difference between image heights generated by the first reflective area G1M. Further, when the first reflective area G1M is formed as an aspherical surface, curvature of field that cannot be sufficiently corrected in a case where the first reflective area G1M is a spherical surface can be corrected by the aspherical surface component of the first reflective area G1M. As a result, it is possible to improve design flexibility of the sagittal amount of the first reflective area G1M, and to correct curvature of field more excellently.

To correct curvature of field of the optical system, the aspherical surface is commonly configured such that the power is smaller in the peripheral part than in the optical axis. In contrast, in the present exemplary embodiment, unlike the common optical system, curvature of field is corrected by the sagittal amount of the first reflective area G1M. Therefore, the aspherical surface amount of the first reflective area G1M is set such that the power is larger in the peripheral part than in the optical axis A.

In the present exemplary embodiment, the above-described excellent aberration correction can be performed by the refractive area G1T and the first reflective area G1M of the first optical element G1. At this time, providing the refractive area G1T and the first reflective area G1M on one optical element makes it possible to prevent increase in the number of optical elements and occurrence of a relative arrangement error of the optical elements, as compared with a case where the refractive area G1T and the first reflective area G1M are provided on different optical elements. Further, the first optical element G1 is the positive meniscus lens having a convex surface toward the object side, which makes it possible to excellently correct magnification chromatic aberration by the refractive area G1T even in a case where the optical system 100 has a wide angle.

As described above, since the third optical element G3 according to the present exemplary embodiment has the positive power, the third optical element G3 excellently corrects various aberrations such as comatic aberration occurred in the refractive area G2T on the image-side surface of the second optical element G2 that has the second reflective area G2M as a convex reflective surface. At this time, the image-side surface of the third optical element G3 has a concave shape toward the object side as in the present exemplary embodiment. When the optical surface (final surface) disposed on the most image side in the optical system 100 is formed as a refractive surface having a concave shape toward the object side, it is possible to excellently correct curvature of field and astigmatism that cannot be sufficiently corrected by the other optical surface. The image-side surface of the third optical element G3 may have a convex shape toward the object side as necessary; however, in this case, a refractive surface having a concave shape toward the object side is further disposed on the image side of the third optical element G3.

Next, to describe effects of the light shielding member 120 and the light shielding area G2S according to the present exemplary embodiment, an imaging apparatus according to a first comparative example is considered. The imaging apparatus according to the first comparative example has a configuration similar to the configuration of the imaging apparatus 1000 according to the present exemplary embodiment except that the imaging apparatus according to the first comparative example does not include the light shielding member 120 and the light shielding area G2S.

Figure 4:
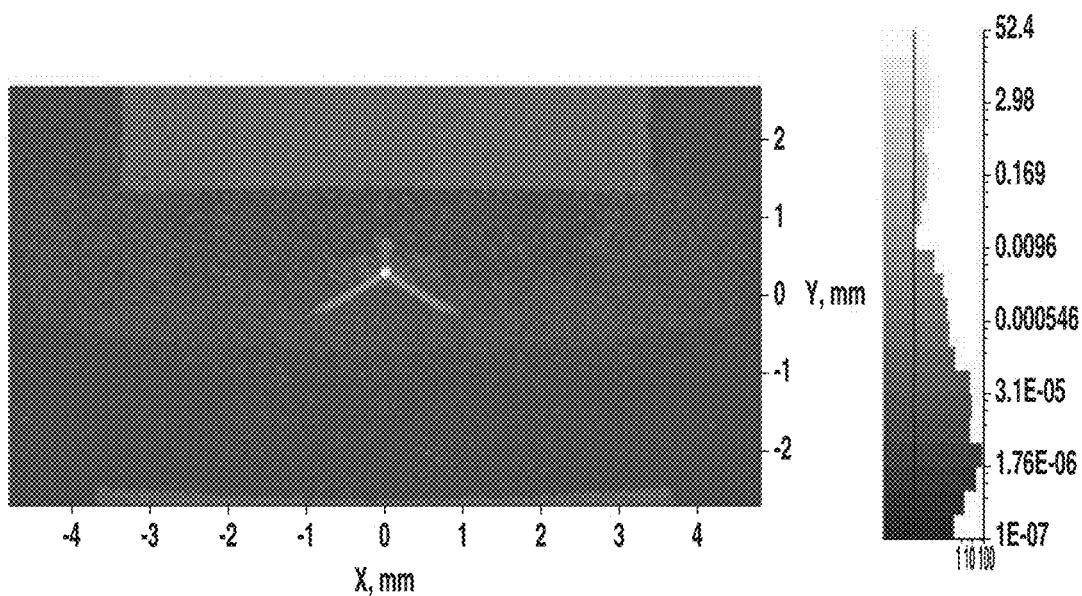
FIG. 4 is a diagram illustrating illuminance distribution on an imaging surface according to each of the first exemplary embodiment and a first comparative example.
Figure 4:
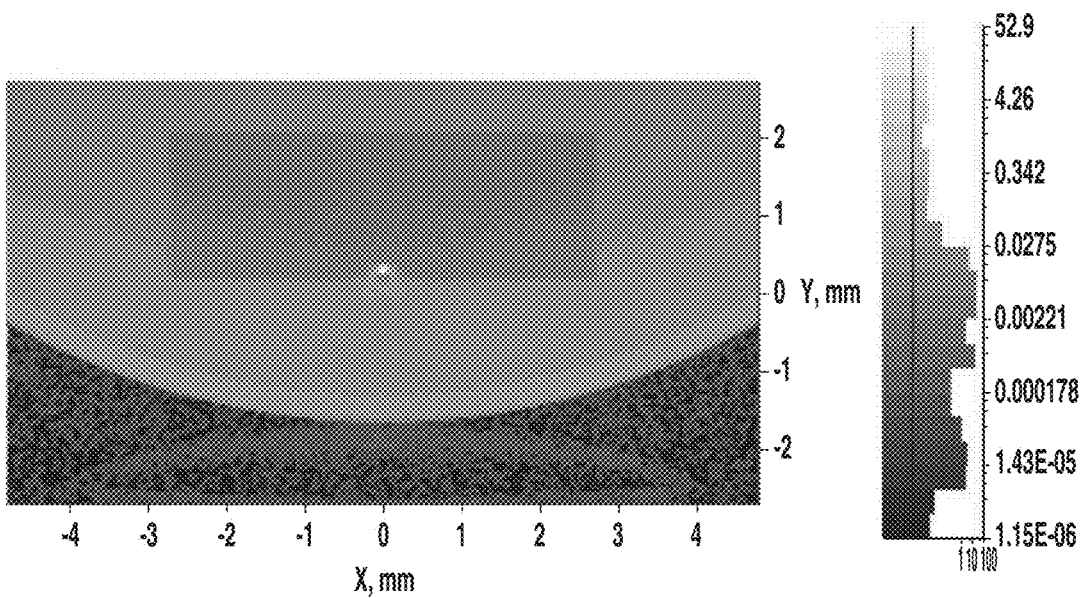

An upper diagram of FIG. 4 illustrates illuminance distribution on the image plane IMG according to the present exemplary embodiment, and a lower diagram of FIG. 4 illustrates illuminance distribution on the image plane IMG according to the first comparative example. A lateral axis and a vertical axis in FIG. 4 each represent a position (mm) with a center of an imaging surface of the imaging element 110 as a reference. In a histogram on a right side of the illuminance distribution diagram, a vertical axis represents illuminance in logarithm, and a lateral axis represents a generation frequency of a pixel having the corresponding illuminance in logarithm. It is found from FIG. 4 that remarkable ghost is not generated in the imaging apparatus 1000 according to the present exemplary embodiment, whereas ghost (pixel having high illuminance) is remarkably generated in the imaging apparatus according to the first comparative example.

Figure 5:
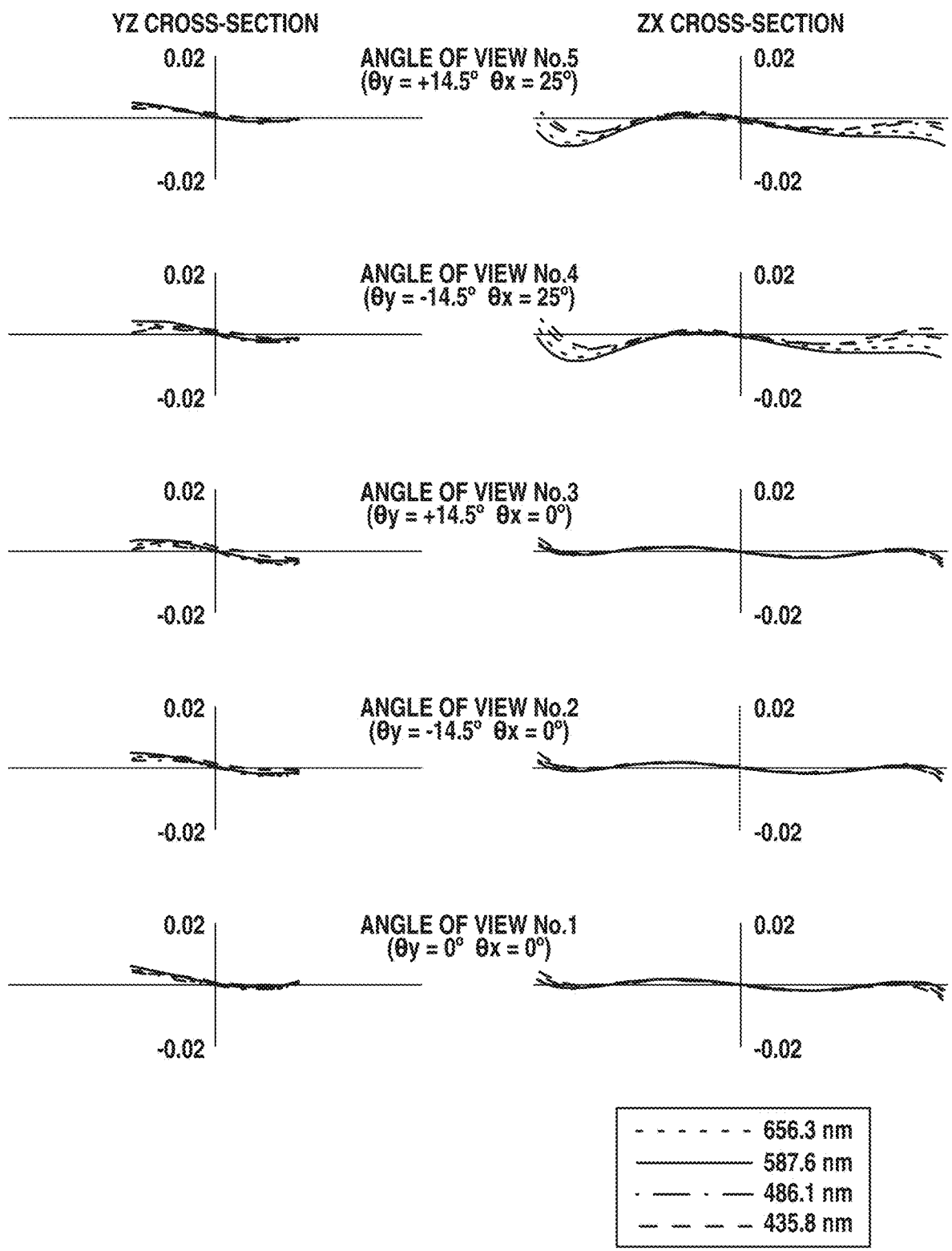
FIG. 5 is a lateral aberration diagram of an optical system according to the first exemplary embodiment.

FIG. 5 is a lateral aberration diagram of the optical system 100 according to the present exemplary embodiment. FIG. 5 illustrates lateral aberration to each of a C-line (wavelength of 656.3 nm), a d-line (wavelength of 587.6 nm), an F-line (wavelength of 486.1 nm), and a g-line (wavelength of 435.8 nm) at five field angles of the optical system 100, and a unit of a numerical value is mm. As can be seen from FIG. 5, aberrations (spherical aberration, comatic aberration, magnification chromatic aberration, on-axis chromatic aberration, curvature of field, and astigmatism) are excellently corrected. Further, an aperture ratio (vignetting) of the optical system 100 is 100% at all field angles. Therefore, vignetting by the second reflective area G2M does not occur, and the optical system bright from the on-axis to the off-axis can be realized.

Figure 6:
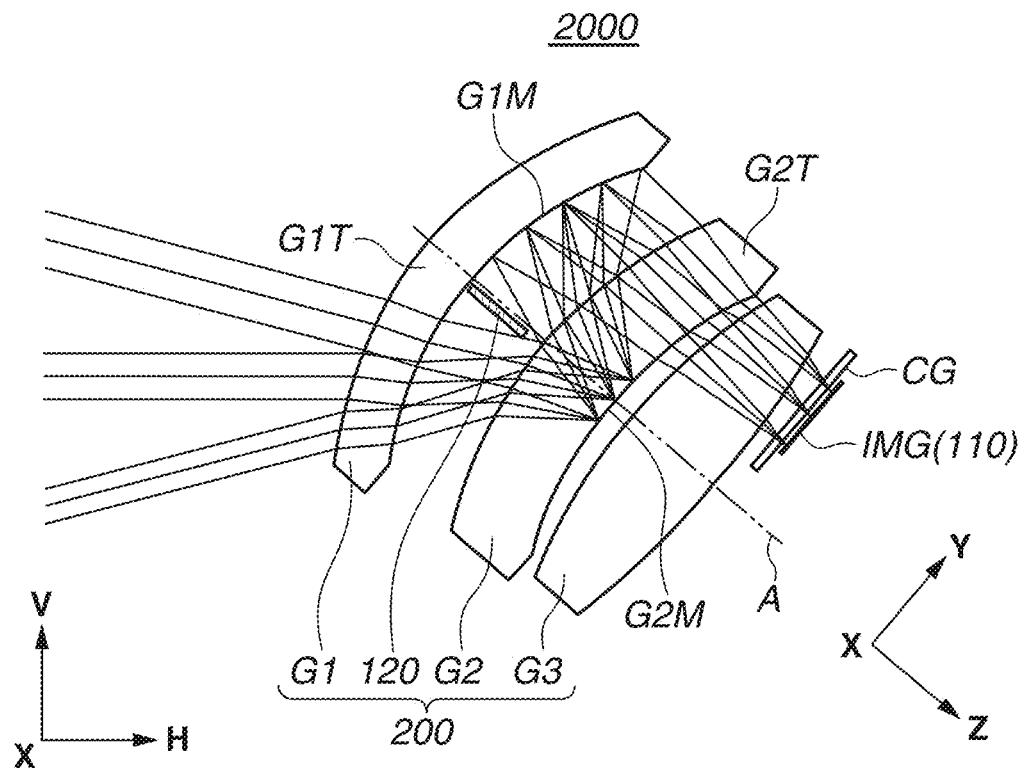
FIG. 6 is a schematic diagram illustrating a main part of an imaging apparatus according to a second exemplary embodiment.
Figure 6:
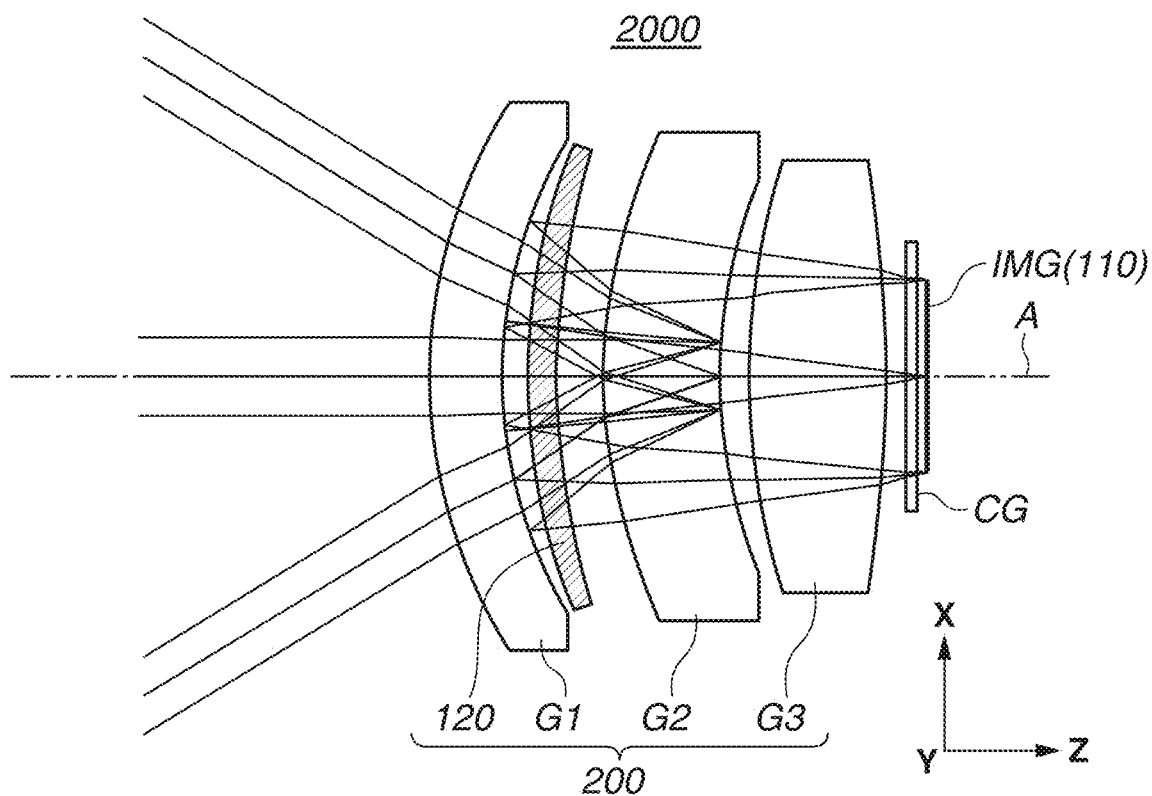

An imaging apparatus 2000 according to a second exemplary embodiment of the disclosure is described below. In the imaging apparatus 2000 according to the present exemplary embodiment, description of a configuration equivalent to the configuration of the imaging apparatus 1000 according to the above-described first exemplary embodiment is omitted. FIG. 6 is a schematic diagram illustrating a main part in the YZ cross-section including the optical axis A of the imaging apparatus 2000, and a schematic diagram illustrating a main part of the imaging apparatus 2000 as viewed from the Y direction.

Figure 7:
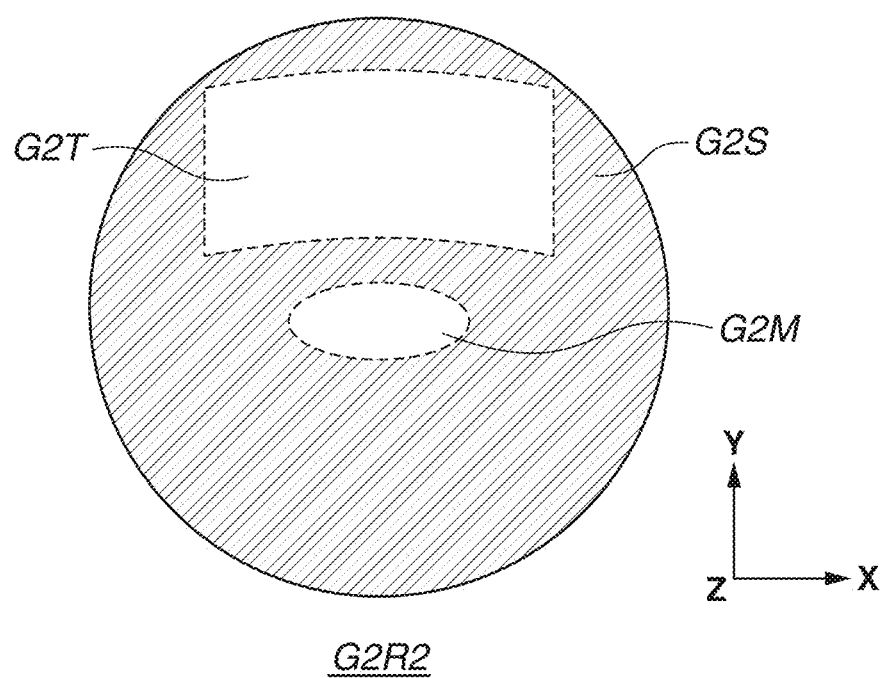
FIG. 7 is a schematic diagram illustrating a main part of a light shielding area according to the second exemplary embodiment.

FIG. 7 is a schematic diagram illustrating a main part of the image-side surface G2R2 of the second optical element G2 as viewed from the object side. As illustrated in FIG. 7, in an optical system 200 according to the present exemplary embodiment, unlike the optical system 100 according to the first exemplary embodiment, a light shielding area G2S is provided on the entire non-effective area of the image-side surface G2R2 of the second optical element G2. This makes it possible to shield the unnecessary light more excellently.

Figure 8:
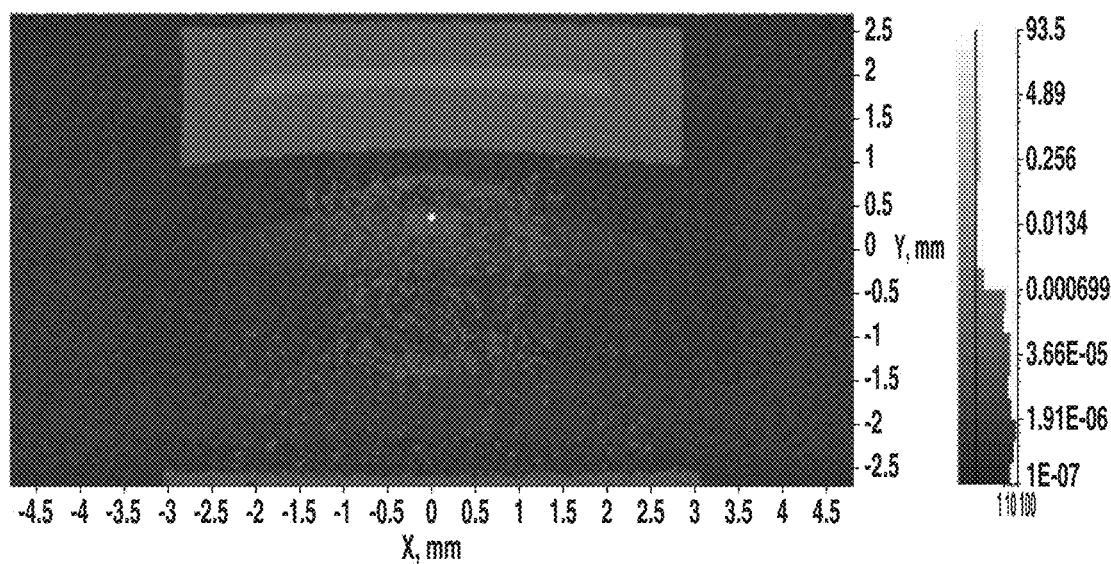
FIG. 8 is a diagram illustrating illuminance distribution on an imaging surface according to each of the second exemplary embodiment and a second comparative example.
Figure 8:
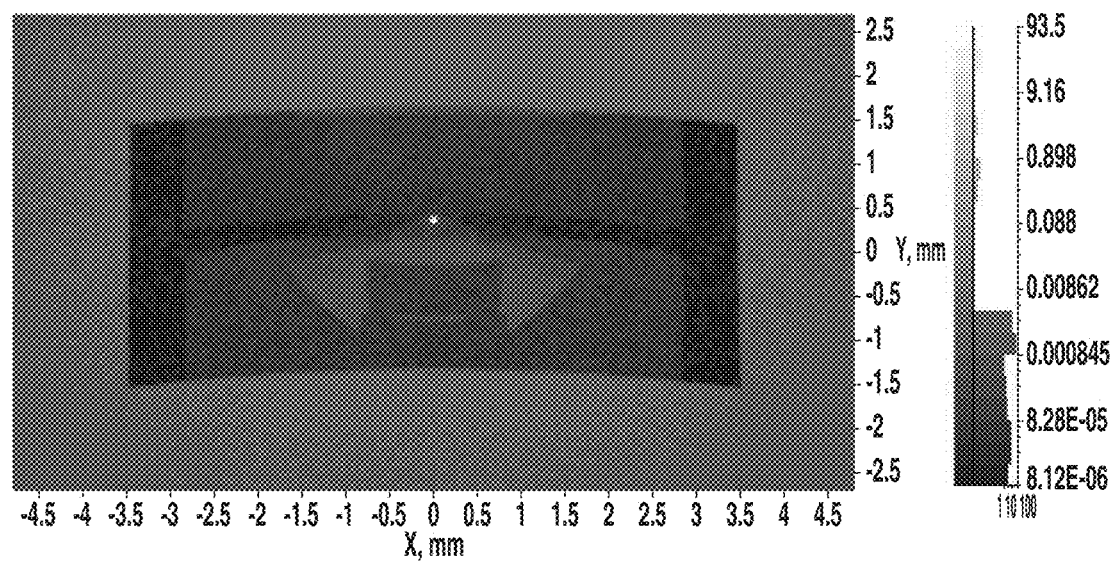

As with the first exemplary embodiment, to describe effects of the light shielding member 120 and the light shielding area G2S according to the present exemplary embodiment, an imaging apparatus according to a second comparative example is considered. The imaging apparatus according to the second comparative example has a configuration similar to the configuration of the imaging apparatus 2000 according to the present exemplary embodiment except that the imaging apparatus according to the second comparative example does not include the light shielding member 120 and the light shielding area G2S. An upper diagram of FIG. 8 illustrates illuminance distribution on the image plane IMG according to the present exemplary embodiment, and a lower diagram of FIG. 8 illustrates illuminance distribution on the image plane IMG according to the second comparative example. It is found from FIG. 8 that remarkable ghost is not generated in the imaging apparatus 2000 according to the present exemplary embodiment, whereas ghost (pixel having high illuminance) is remarkably generated in the imaging apparatus according to the second comparative example.

Figure 9:
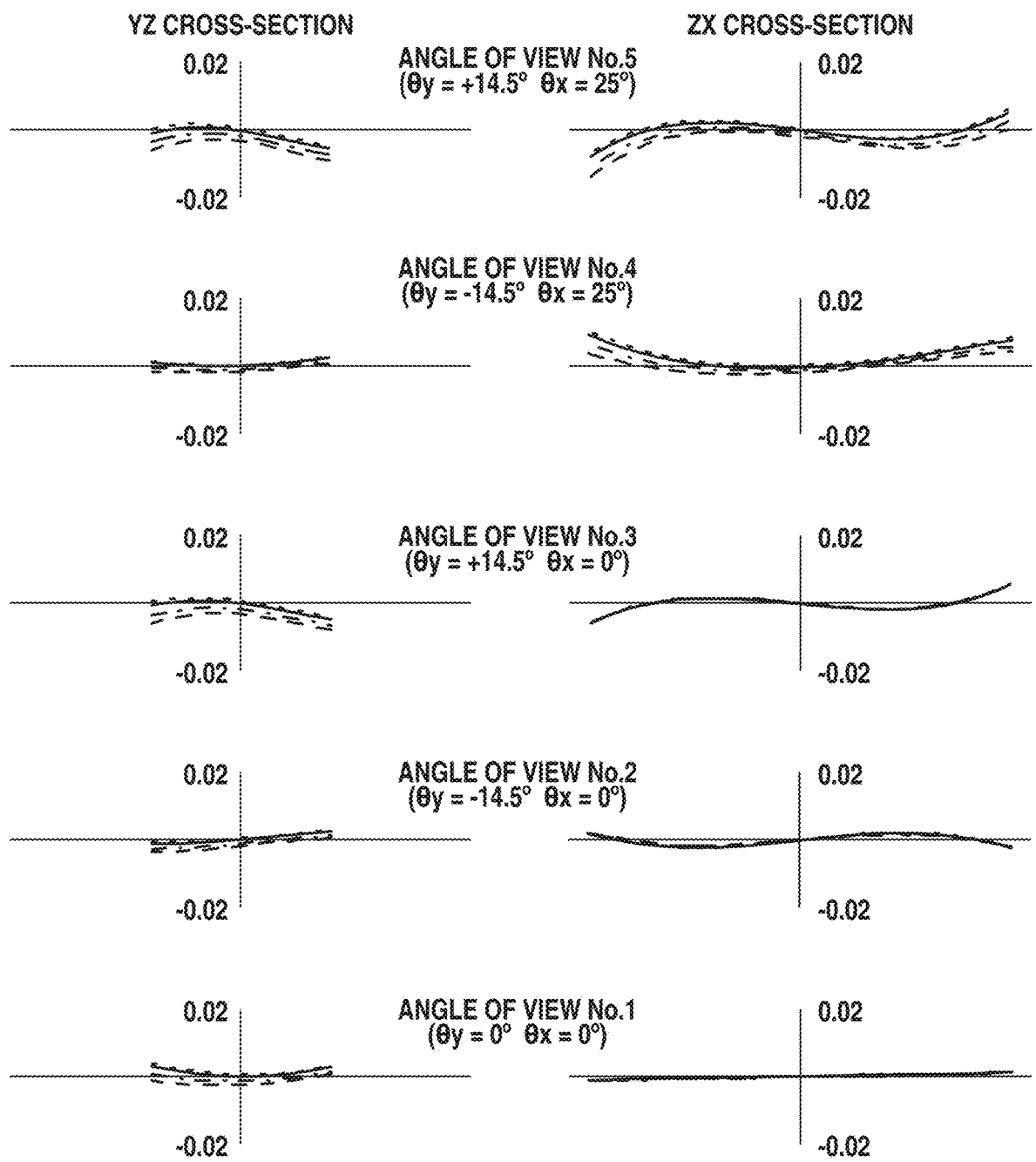
FIG. 9 is a lateral aberration diagram of an optical system according to the second exemplary embodiment.

FIG. 9 is a lateral aberration diagram of the optical system 200 according to the present exemplary embodiment. As can be seen from FIG. 9, aberrations are excellently corrected. Further, an aperture ratio of the optical system 200 is 100% at all field angles, and the optical system bright from the on-axis to the off-axis can be realized.

NUMERICAL EXAMPLES

In the following, numerical examples 1 and 2 corresponding to the optical systems according to the above-described first and second exemplary embodiments are described. In each of the numerical examples, a surface number represents a number (i) of the optical surface counted from the magnification side, r represents a radius of curvature [mm] of an i-th optical surface (i-th surface), and d represents an interval [mm] between the i-th surface and a (i+1)-th surface. Nd and vd respectively represent a refractive index and an Abbe number at the d-line of the medium between the i-th surface and the (i+1)-th surface. Further, Fno represents an aperture value, and a unit of a focal length is [mm]. The surface interval d is positive when the direction is toward the image side along the optical path, and is negative when the direction is toward the object side along the optical path. Note that "E±N" means "×10$^{±N}$".

In each of the numerical examples, an optical surface having a surface number with a symbol "*" on its side is an aspherical surface. Each of the optical surfaces having the aspherical surface shape in each of the numerical examples has a rotationally symmetric shape around the optical axis A, and is expressed by the following aspherical surface expression.

$$z = \frac{cr^2}{1+\sqrt{1-(1+k)c^2r^2}} + Ar^4 + Br^6 + Cr^8 + Dr^{10} + Er^{12} + Fr^{14}$$

In the expression, z is a sagittal amount (mm) of the aspherical surface shape in the optical axis direction, c is a curvature (1/mm) on the optical axis A, k is a conic constant, r is a distance (mm) from the optical axis A in a radius direction, and A to G are aspherical coefficients of fourth to 14-th order terms. In the above-described aspherical surface expression, a first term represents a sagittal amount of a reference spherical surface, and a radius of curvature of the reference spherical surface is R=1/c. Further, a second term and subsequent terms each represent a sagittal amount (aspherical surface amount) of the aspherical surface component added to the reference spherical surface.

In the numerical example 1, the aspherical coefficients of the fourth to tenth order terms are used, and in the numerical example 2, the aspherical coefficients of the fourth to 14-th order terms are used. Alternatively, the aspherical coefficients of 16-th or higher order terms may be used in each of the numerical examples. In each of the numerical examples, in a case where the optical surface has the aspherical surface shape, the radius of curvature of the reference spherical surface is used as the radius of curvature of the optical surface, and the curvature of radius satisfies the above-described inequalities.

Numerical Example 1

Various Kinds of Data

| Focal length | 10.8 |
|---|---|
| Fno (horizontal cross-section) | 1.2 |
| Fno (vertical cross-section) | 3.0 |
| Field angle (horizontal cross-section) | ±25° |
| Field angle (vertical cross-section) | ±14.5° |

Surface Data

| Surface number | r | d | Nd | vd |
|---|---|---|---|---|
| 1 | 22.61 | 3.31 | 1.847 | 23.8 |
| 2* | 22.98 | 3.15 | | |
| 3 | 37.27 | 7.97 | 1.487 | 70.2 |
| 4* | 29.37 | −7.97 | 1.487 | 70.2 |
| 5 | 37.27 | −3.15 | | |
| 6* | 22.98 | 3.15 | | |
| 7 | 37.27 | 7.97 | 1.487 | 70.2 |
| 8* | 29.37 | 0.15 | | |
| 9 | 24.44 | 9.16 | 1.516 | 64.1 |
| 10 | −43.13 | 0.89 | | |
| 11 | ∞ | 1.00 | 1.516 | 64.1 |
| 12 | ∞ | 1.00 | | |

Aspherical Coefficients

| | Surface Number | | |
|---|---|---|---|
| | 2, | 4, 8 | 6, |
| K | −4.65E−01 | — | −0.4202281 |
| A | 4.73E−06 | 2.27E−05 | 6.13E−06 |
| B | 2.78E−08 | 1.75E−10 | 1.59E−08 |
| C | −5.46E−11 | 5.85E−11 | −8.36E−11 |
| D | 6.55E−13 | −1.26E−13 | 6.80E−13 |
| E | −2.88E−15 | — | −2.47E−15 |
| F | 3.10E−18 | — | 4.08E−18 |

Numerical Example 2

Various Kinds of Data

| Focal length | 10.8 |
|---|---|
| Fno (horizontal cross-section) | 1.2 |
| Fno (vertical cross-section) | 3.0 |
| Field angle (horizontal cross-section) | ±25° |
| Field angle (vertical cross-section) | ±14.5° |

Surface Data

| Surface number | r | d | Nd | vd |
|---|---|---|---|---|
| 1 | 24.05 | 3.7 | 1.69 | 53.2 |
| 2* | 23.35 | 6.2 | | |
| 3 | 27.97 | 5.9 | 1.59 | 67.0 |
| 4* | 27.70 | 0.0 | 1.59 | 67.0 |
| 5 | 27.70 | −5.9 | | |
| 6* | 27.97 | −6.2 | | |
| 7 | 23.35 | 6.2 | 1.59 | 67.0 |
| 8* | 27.97 | 5.9 | | |
| 9 | 27.70 | 1.5 | 1.53 | 74.7 |
| 10 | 35.30 | 6.8 | | |
| 11 | ∞ | 1.1 | 1.52 | 64.1 |
| 12 | ∞ | 0.5 | | |

Aspherical Coefficients

| | Surface Number | | |
|---|---|---|---|
| | 1 | 2, 6 | 4, 8 |
| K | −0.6444045 | −4.11E−01 | 0.00E+00 |
| A | 1.75E−06 | 6.37E−06 | 8.47E−06 |
| B | −2.53E−09 | 1.28E−08 | 3.66E−08 |
| C | 2.43E−11 | −2.03E−11 | 1.74E−10 |
| D | −2.33E−13 | 3.32E−13 | −6.48E−14 |
| E | 1.73E−16 | −1.12E−15 | −8.47E−15 |
| F | | 1.90E−18 | 3.86E−17 |

Table 1 described below illustrates values relating to the inequalities about the optical systems according to the above-described exemplary embodiments. The values L1, L2, R1, and La are determined from the above-described numerical examples. As illustrated in Table 1, the optical system according to each of the exemplary embodiments satisfies the above-described inequalities (1) to (3).

TABLE 1

| | First exemplary embodiment | Second exemplary embodiment |
|---|---|---|
| L2/L1 | 2.10 | 1.82 |
| |R1/L1| | 2.07 | 1.93 |
| La/f | 2.47 | 2.38 |
| L1 | 11.12 | 12.10 |

TABLE 1-continued

| | First exemplary embodiment | Second exemplary embodiment |
|---|---|---|
| L2 | 23.32 | 22.00 |
| R1 | 23.00 | 23.30 |
| f | 10.80 | 10.80 |
| La | 26.63 | 25.70 |

[On-Vehicle System]

Figure 10:
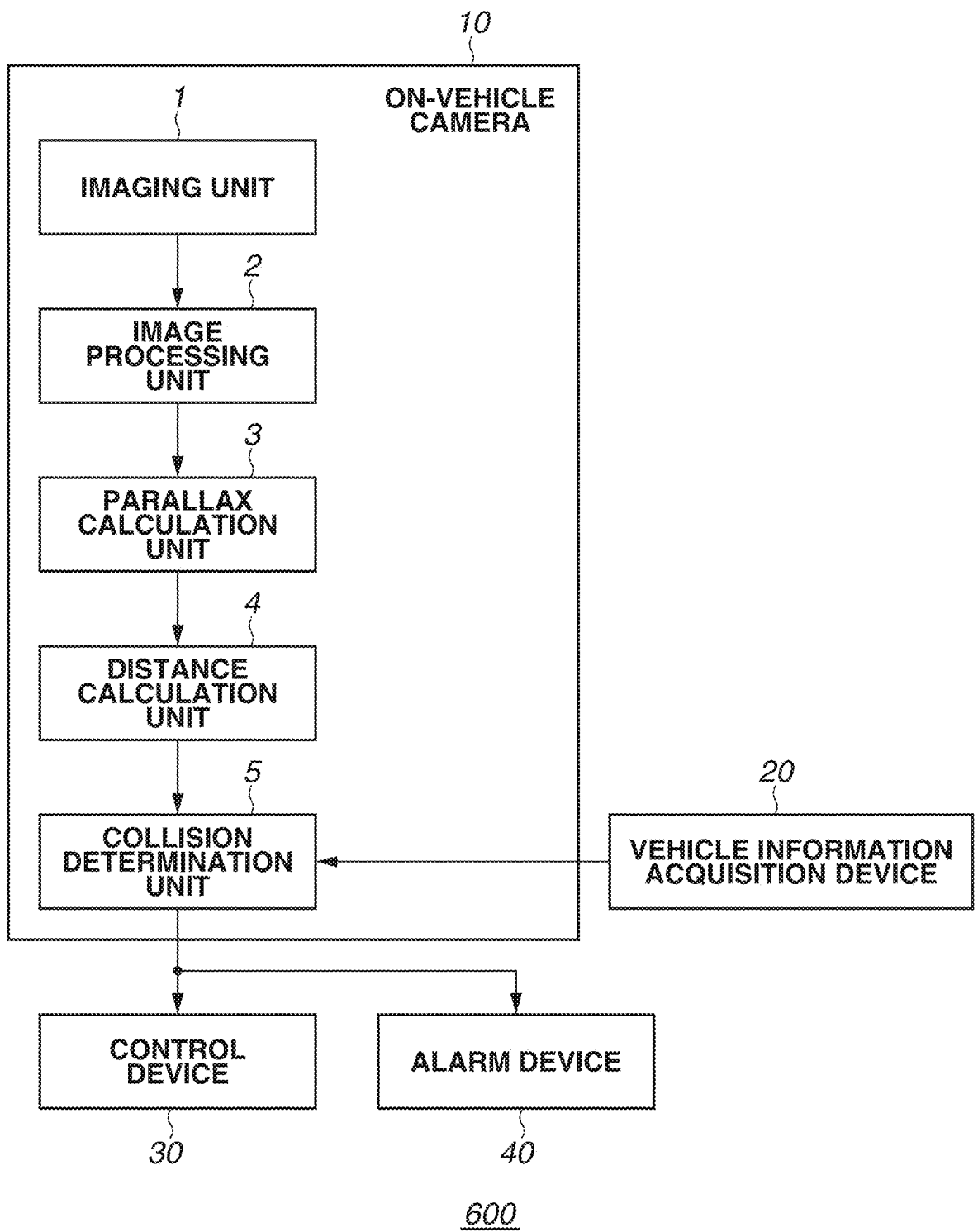
FIG. 10 is a functional block diagram of an on-vehicle system according to an exemplary embodiment.
Figure 11:
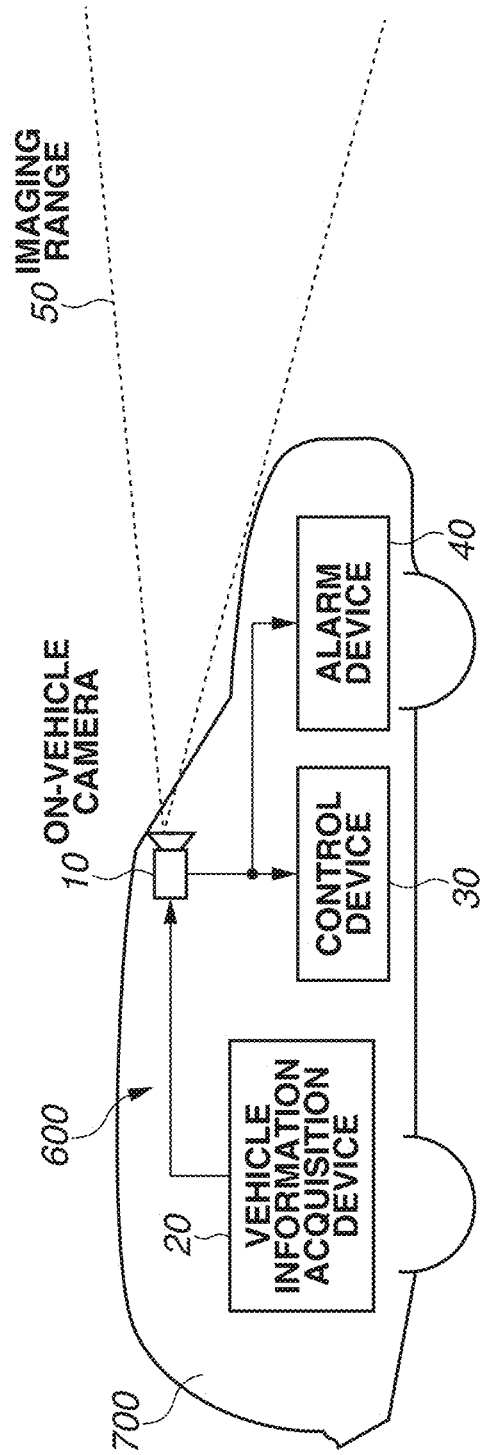
FIG. 11 is a schematic diagram illustrating a main part of a vehicle according to the exemplary embodiment.

FIG. 10 is a configuration diagram of an on-vehicle camera 10 and an on-vehicle system (driving support apparatus) 600 including the on-vehicle camera 10 according to the present exemplary embodiment. The on-vehicle system 600 is held by a movable moving body (moving apparatus) such as an automobile (vehicle), and supports driving (control) of the vehicle based on image information around the vehicle acquired by the on-vehicle camera 10. FIG. 11 is a schematic diagram of a vehicle 700 as the moving apparatus including the on-vehicle system 600. FIG. 11 illustrates a case where an imaging range 50 of the on-vehicle camera 10 is set in front of the vehicle 700; however, the imaging range 50 may be set on a rear side, a side, or the like of the vehicle 700.

As illustrated in FIG. 10, the on-vehicle system 600 includes the on-vehicle camera 10, a vehicle information acquisition device 20, a control device (control unit or electronic control unit (ECU)) 30, and an alarm device (alarm unit) 40. The on-vehicle camera 10 includes an imaging unit 1, an image processing unit 2, a parallax calculation unit 3, a distance acquisition unit (acquisition unit) 4, and a collision determination unit 5. A processing unit is configured by the image processing unit 2, the parallax calculation unit 3, the distance acquisition unit 4, and the collision determination unit 5. The imaging unit 1 corresponds to the imaging apparatus according to any of the above-described exemplary embodiments.

Figure 12:
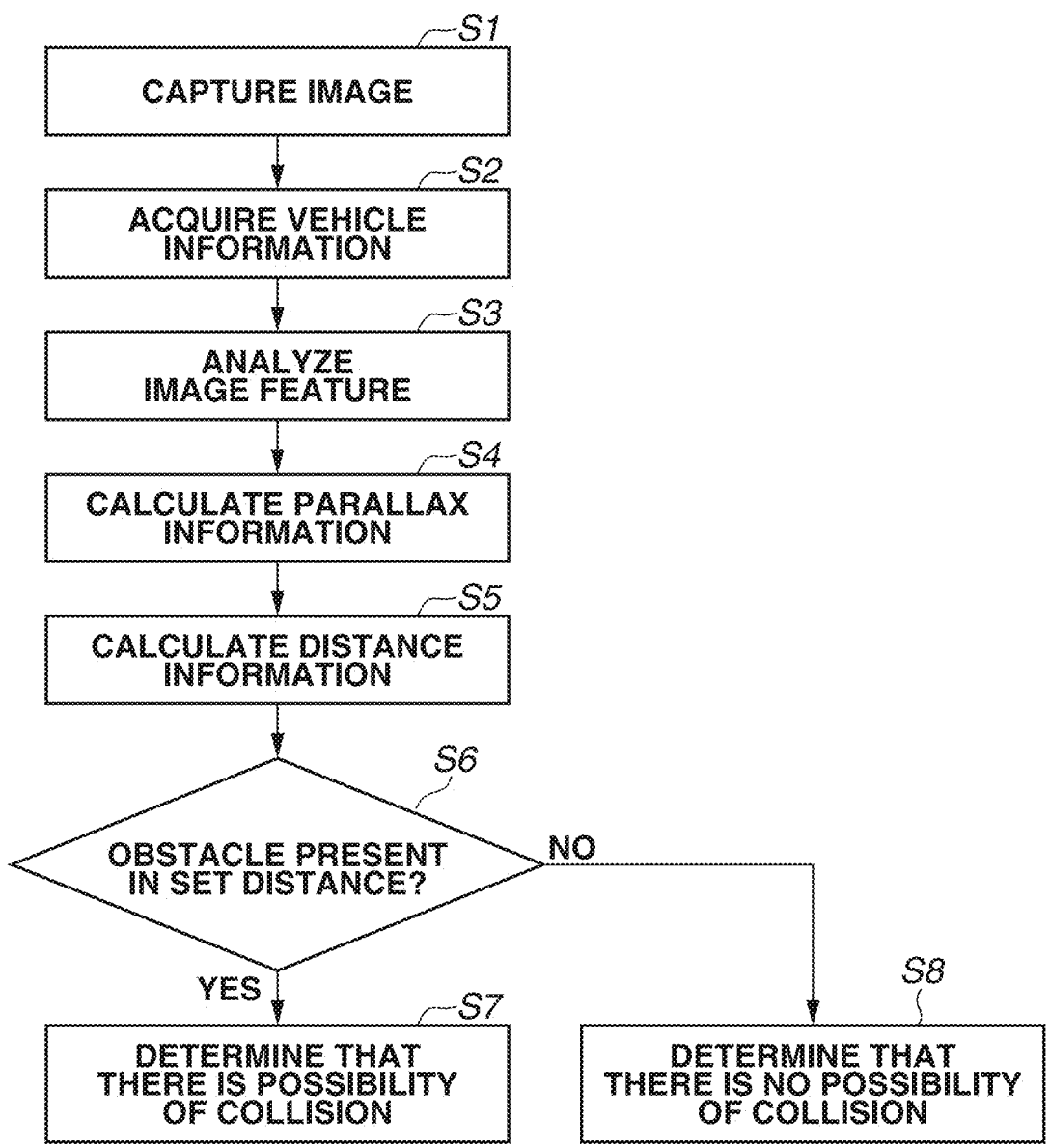
FIG. 12 is a flowchart illustrating an operation example of the on-vehicle system according to the exemplary embodiment.

FIG. 12 is a flowchart illustrating an operation example of the on-vehicle system 600 according to the present exemplary embodiment. In the following, the operation of the on-vehicle system 600 is described with reference to the flowchart.

First, in step S1, the imaging unit 1 images objects such as an obstacle and a pedestrian around the vehicle, and acquires a plurality of pieces of image data (parallax image data).

In step S2, the vehicle information acquisition device 20 acquires vehicle information. The vehicle information includes a speed, a yaw rate, and a rudder angle of the vehicle.

In step S3, the image processing unit 2 performs image processing on the plurality of pieces of image data acquired by the imaging unit 1. More specifically, the image processing unit 2 performs image feature analysis to analyze feature amounts such as an amount and a direction of an edge in the image data and a density value of the image data. The image feature analysis may be performed on each of the plurality of pieces of image data or on a part of the plurality of pieces of image data.

In step S4, the parallax calculation unit 3 calculates parallax (image deviation) information among the plurality of pieces of image data acquired by the imaging unit 1. As a method of calculating the parallax information, a well-known method such as a sequential similarity detection algorism (SSDA) method or an area correlation method is usable. Therefore, description of the method of calculating the parallax information is omitted. Note that the processing in steps S2, S3, and S4 may be performed in the above-described order, or may be performed in parallel to one another.

In step S5, the distance acquisition unit 4 acquires (calculates) distance information with the object imaged by the imaging unit 1. The distance information can be calculated based on the parallax information calculated by the parallax calculation unit 3 and an internal parameter and an external parameter of the imaging unit 1. The distance information is information about a position relative to the object, such as an interval with the object, a defocus amount, and an image deviation amount. The distance information may directly represent a distance value of the object in the image or indirectly represent the information corresponding to the distance value.

Further, in step S6, the collision determination unit 5 determines whether the distance to the object is included in a range of a preset distance, by using the vehicle information acquired by the vehicle information acquisition device 20 and the distance information calculated by the distance acquisition unit 4. As a result, it is possible to determine whether the object is present in the set distance around the vehicle, and to determine possibility of collision between the vehicle and the object. In a case where the object is present in the set distance (YES in step S6), the collision determination unit 5 determines that "there is possibility of collision" in step S7. In a case where the object is not present in the set distance (NO in step S6), the collision determination unit 5 determines that "there is no possibility of collision" in step S8.

Next, in the case where the collision determination unit 5 determines that "there is possibility of collision", the collision determination unit 5 notifies (transmits) the determination result to the control device 30 and the alarm device 40. At this time, the control device 30 controls the vehicle based on the determination result of the collision determination unit 5 in step S6, and the alarm device 40 issues an alarm to a user (driver and passenger) of the vehicle based on the determination result of the collision determination unit 5 in step S7. The determination result may be notified at least one of the control device 30 and the alarm device 40.

The control device 30 outputs a control signal to a driving unit (engine, motor, etc.) of the vehicle to control movement of the vehicle. For example, the control device 30 performs control to apply a brake to the vehicle, return an accelerator, turn wheels, or generate a control signal for producing a braking force in each wheel, to suppress output of the engine or the motor. The alarm device 40 issues an alarm to the user by, for example, emitting alarm sound, displaying alarm information on a screen of a car navigation system, or vibrating a seatbelt and a steering.

According to the on-vehicle system 600 in the present exemplary embodiment, it is possible to effectively detect the object, and to avoid collision between the vehicle and the object by the above-described processing. In particular, the optical system according to each of the above-described exemplary embodiments is applied to the on-vehicle system 600, which makes it possible to perform detection of the object and collision determination over a wide field angle while downsizing the whole of the on-vehicle camera 10 to enhance the arrangement flexibility.

Various exemplary embodiments are considered for the calculation of the distance information. As an example, a case is described where a pupil division imaging element including a plurality of pixel portions regularly arranged in a two-dimensional array shape is adopted as the imaging element included in the imaging unit 1. In the pupil division imaging element, each pixel portion includes a micro-lens and a plurality of photoelectric conversion units, receives a pair of light fluxes passing through different areas in a pupil of the optical system, and outputs a pair of pieces of image data from each of the photoelectric conversion units.

The image deviation amount of each area is calculated by correlation calculation between the pair of pieces of image data, and the distance acquisition unit 4 calculates image deviation map data representing distribution of the image deviation amounts. Alternatively, the distance acquisition unit 4 may further convert the image deviation amounts into defocus amounts, and may generate defocus map data representing distribution of the defocus amounts (distribution on a two-dimensional plane of a captured image). Moreover, the distance acquisition unit 4 may acquire distance map data of the interval with the object converted from the defocus amounts.

The on-vehicle system 600 and the vehicle 700 may include a notification device (notification unit) that notifies, if the vehicle 700 collides with an obstacle, the collision to a manufacturer (maker) of the on-vehicle system, a distributer (dealer) of the vehicle 700, etc. For example, as the notification device, a device is adoptable that transmits information (collision information) about the collision between the vehicle 700 and the obstacle, to a preset external notification destination by an e-mail or the like.

As described above, the notification device automatically notifies the collision information, which makes it possible to promptly take measures such as inspection and repair after the collision occurs. The notification destination of the collision information may be an optional destination set by the user, such as an insurance company, a medical institution, or police. Further, the notification device may notify failure information on each unit and consumption information on consumables to the notification destination, without limitation to the collision information. Presence/absence of the collision may be detected using the distance information acquired by the distance acquisition unit 4, or may be detected by the other detection unit (sensor).

In the present exemplary embodiment, the on-vehicle system 600 is applied to the driving support (collision damage reduction); however, the application is not limited thereto, and the on-vehicle system 600 may be applied to cruise control (including all speed following function), automatic driving, etc. Further, the application of the on-vehicle system 600 is not limited to the vehicle such as the automobile, and the on-vehicle system 600 is applicable to moving bodies such as a vessel, an aircraft, and an industrial robot. Furthermore, the application of the on-vehicle system 600 is not limited to the moving body, and the on-vehicle system 600 is applicable to various apparatuses using object recognition, such as an intelligent transportation system (ITS).

[Ranging Device]

A case is described in detail where the imaging apparatus according to each of the above-described exemplary embodiments is applied to a ranging device of an on-vehicle camera, or the like.

As described above, the vertical field angle of the optical system according to each of the exemplary embodiments is set on one side of the optical axis A. Therefore, in a case where the optical system is applied to the on-vehicle camera 10 and the on-vehicle camera 10 is installed in the vehicle, the on-vehicle camera 10 is installed such that the optical axis A of the optical system is not parallel to the horizontal direction based on the position of the object. For example, in a case where the optical system according to each of the above-described exemplary embodiments is used as a ranging optical system, the optical system is disposed such that the optical axis A is inclined upward from the horizontal direction and a center of the vertical field angle comes close to the horizontal direction. Alternatively, the optical system may be disposed such that the optical axis A is inclined downward from the horizontal direction after the optical system is rotated by 180 degrees around the X axis (turned upside down). This makes it possible to appropriately set the imaging range of the on-vehicle camera 10.

In the optical system according to each of the exemplary embodiments, the image forming performance on the axis is the highest, and the image forming performance at the peripheral field angle is low. Therefore, the optical system is disposed such that the light flux from the object of interest passes through a position near the axis of the optical system. For example, in a case where it is necessary to pay attention to a sign and an obstacle on the road by the on-vehicle camera 10, the image forming performance at a lower field angle (ground side) is enhanced more than the image forming performance at the upper field angle (sky side) of the horizontal direction. At this time, in the case where the optical system according to each of the exemplary embodiments is adopted, the optical system is disposed such that the optical axis A is inclined downward from the horizontal direction and the field angle near the optical axis A is directed downward after the optical system is once turned upside down.

Figure 13:
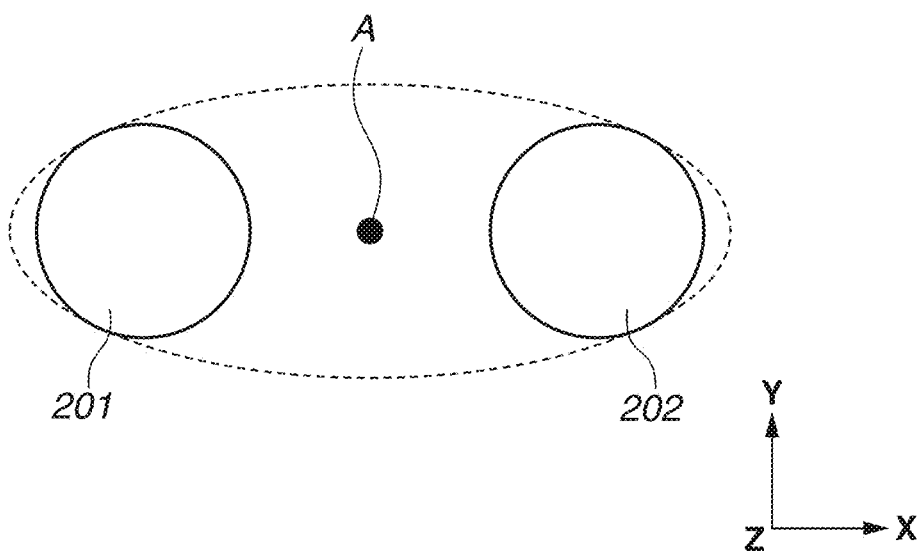
FIG. 13 is a schematic diagram illustrating a main part of a reflection portion of a ranging optical system according to the exemplary embodiment.

FIG. 13 is a schematic diagram illustrating a main part of a reflective portion in the second reflective area G2M as viewed from −Z side in the Z direction in the case where the optical system according to each of the exemplary embodiments is adopted as the ranging optical system. In FIG. 13, a solid line indicates the reflective portion in the second reflective area G2M of the ranging optical system, and a dashed line indicates the second reflective area G2M of the optical system 100 or 200 according to the first or second exemplary embodiment.

As illustrated in FIG. 13, two reflective portions 201 and 202 (first and second reflective portions) eccentric in the X direction from the optical axis A are provided in the second reflective area G2M of the ranging optical system. An area other than the two reflective portions 201 and 202 in the second reflective area G2M serves as a light shielding portion similar to the light shielding area G2S. The two reflective portions 201 and 202 can divide a pupil of the ranging optical system. The reflective portions 201 and 202 are each formed by a reflective film or the like, as in the exemplary embodiments. An aperture value of each of the reflective portions 201 and 202 in the ranging optical system is 3.0 in the X direction and the Y direction.

In the case where the ranging optical system is used in which the pupil is divided, an imaging element that can photoelectrically convert an image of the object formed by the light flux passing through the reflective portion 201 and an image of the object formed by the light flux passing through the reflective portion 202 in a distinguishing manner is used as the imaging element disposed on the image plane. Such an imaging element, the ranging optical system, and the above-described processing unit can configure a ranging device of the on-vehicle camera, or the like.

When the object is located on a focal plane of the ranging optical system, the positional deviation does not occur between the images by the two divided light fluxes on the image plane of the ranging optical system. In contrast, when the object is located at a position other than the focal plane of the ranging optical system, the positional deviation occurs between the images by the two divided light fluxes. At this time, the positional deviation between the images formed by the respective light fluxes corresponds to a displacement amount of the object from the focal plane. Therefore, the distance to the object can be measured by acquiring the positional deviation amount between the images by the respective light fluxes and the direction of the positional deviation.

Further, when the optical elements in the ranging optical system are configured similarly to the optical elements in each of the exemplary embodiments, it is possible to excellently correct various aberrations, and to realize high ranging accuracy. At this time, an aperture ratio of the ranging optical system is 100% at all field angles. Therefore, applying the ranging optical system to the ranging device makes it possible to secure the stable ranging accuracy at all field angles.

In the ranging optical system, the two reflective portions are made eccentric in the X direction; however, the two reflective portions may be made eccentric in the Y direction, as necessary. To improve the ranging accuracy, however, the two reflective portions are made eccentric in the X direction. This is because, in each of the optical systems 100 and 200 before the two reflective portions are applied, the aperture value in the X direction symmetrical about the optical axis A is smaller than the aperture value in the Y direction asymmetrical about the optical axis A.

Even in a case where the second reflective area G2M includes the two reflective portions separated from each other in the X direction, the diameter of the effective area in the X direction is set larger than the diameter in the Y direction. In other words, a distance between ends of the two reflective portions separated farthest from each other in the X direction is set larger than the maximum diameter of each of the two reflective portions in the Y direction. This makes it possible to easily avoid optical path interference in the YZ cross-section while improving brightness and resolution in the ZX cross-section.

[Projection Apparatus]

In a case where the optical system according to each of the above-described exemplary embodiments is applied as a projection optical system to a projection apparatus, a display surface of a display element such as a liquid crystal panel (spatial modulator) is disposed at the position of the reduction surface of the optical system. In the case where the optical system is applied to the projection apparatus, however, the object side and the image side are inverted, and the optical path is directed in an opposite direction. In other words, an image displayed on the display surface (reduction surface) of the display element disposed on the object side can be projected (formed) on a projection surface (magnification surface) such as a screen disposed on the image side, by the optical system. Also, in this case, the inequalities in each of the exemplary embodiments are satisfied as in the case where the optical system is applied to the imaging apparatus.

[Modifications]

Although the exemplary embodiments and examples of the disclosure have been described above, the disclosure is not limited to these exemplary embodiments and examples, and various combinations, modifications, and alternations can be made within the scope of the disclosure.

For example, in each of the exemplary embodiments, the catadioptric element that includes both of the first reflective area G1M and the refractive area G1T is adopted as the first optical element G1. Alternatively, a reflective element (mirror) including the first reflective area G1M may be adopted as the first optical element G1. Further, the optical system according to each of the exemplary embodiments includes the third optical element G3; however, the optical system may adopt a configuration consisting of the first optical element G1 and the second optical element G2. In this case, as the second optical element G2, a prism in which each of the object-side surface and the image-side surface consists of a plurality of optical surfaces different in radius of curvature may be adopted. This makes it possible to realize excellent image forming performance while reducing the number of optical elements as compared with the optical system according to each of the exemplary embodiments.

Figure 14:
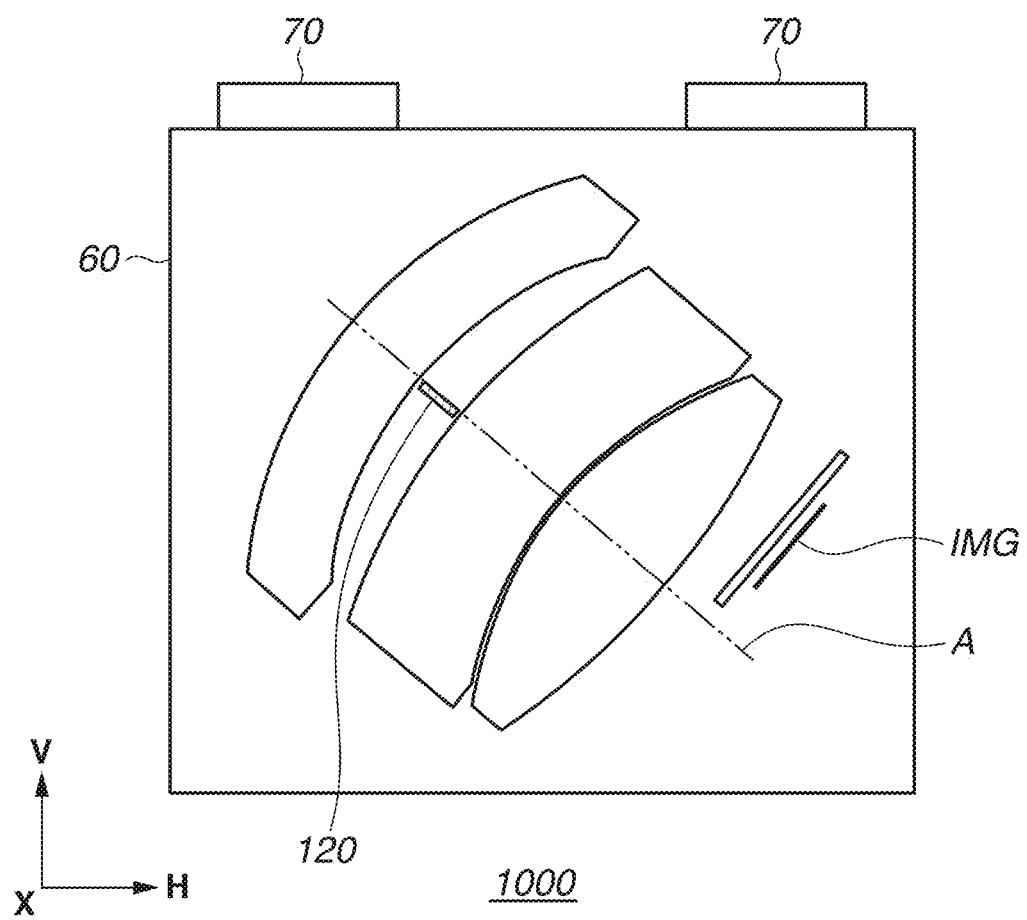
FIG. 14 is a diagram illustrating a reference surface provided in a holding member of an imaging apparatus.

To fix (position) the imaging apparatus to an external object (vehicle or building), a reference surface for positioning may be provided in the holding member (housing) holding the optical system and the imaging element. For example, in a case where the imaging apparatus is installed on a ceiling of a vehicle or a building, it is sufficient to provide the reference surface on an upper side of the optical axis A of the holding member in the vertical direction in order to position the imaging apparats in the vertical direction. At this time, to appropriately incline the optical axis A of the optical system as described above, the reference surface of the holding member is nonparallel to the optical axis A. For example, as illustrated in FIG. 14, it is sufficient to provide a reference surface 70 that is substantially parallel to the horizontal plane (HX plane), at an end on an upper side (+V side) of a holding member 60 in the vertical direction.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-210888, filed Nov. 21, 2019, which is hereby incorporated by reference herein in its entirety.

What is claimed is:

1. An optical system, comprising:
a first optical element including a first reflective area having a convex shape toward a magnification side;
a second optical element including a second reflective area having a convex shape toward the magnification side; and
a light shielding member disposed between the first optical element and the second optical element; and
a holding member holding the light shielding member,
wherein light from the magnification side travels to a reduction side through the second reflective area, the first reflective area, and a refractive area of the second optical element in order,
wherein light from the refractive area forms an image on only one side of an optical axis in a first cross-section including the optical axis,
wherein the light shielding member is disposed between light entering the second reflective area and light entering the first reflective area in the first cross-section, and
wherein the holding member contacts a non-effective area on a reduction-side surface of the first optical element and a non-effective area on a magnification-side surface of the second optical element.

2. The optical system according to claim 1, wherein the second reflective area is included in a reduction-side surface of the second optical element.

3. The optical system according to claim 1, wherein an optical surface including the second reflective area of the second optical element includes a light shielding area in an area other than the second reflective area and the refractive area.

4. The optical system according to claim 3, wherein an optical surface not including the second reflective area of the second optical element includes a light shielding area provided in an area other than the refractive area.

5. The optical system according to claim 1,
wherein the second reflective area includes first and second reflective portions reflecting part of the light, and
wherein the first and second reflective portions are separated from each other in a first direction perpendicular to the first cross-section.

6. The optical system according to claim 1, wherein, as viewed in a second direction that is parallel to the first cross-section and perpendicular to the optical axis, the light shielding member has a meniscus shape convex toward the magnification side.

7. The optical system according to claim 6, wherein, as viewed in the second direction, a radius of curvature at an end of the light shielding member on the reduction side is greater than a radius of curvature at an end of the light shielding member on the magnification side.

8. The optical system according to claim 1, wherein the holding member is present outside the first reflective area and the second reflective area as viewed from an optical axis direction.

9. The optical system according to claim 1, wherein the refractive area of the second optical element has negative power.

10. The optical system according to claim 1, wherein the first reflective area is included in a reduction-side surface of the first optical element.

11. The optical system according to claim 1, wherein the following inequality is satisfied:

$$1.5 \leq L2/L1 \leq 6.5$$

where L1 is an interval between an optical surface including the first reflective area and an optical surface including the second reflective area, and L2 is an interval between the optical surface including the first reflective area and a light receiving surface.

12. The optical system according to claim 1, wherein the following inequality is satisfied:

$$1.3 \leq |R1/L1| \leq 4.0$$

where L1 is an interval between an optical surface including the first reflective area and an optical surface including the second reflective area, and R1 is a radius of curvature of the optical surface including the first reflective area.

13. The optical system according to claim 1, further comprising a third optical element disposed on a reduction side of the second optical element, the third optical element including a refractive area having positive power.

14. An imaging apparatus, comprising:
the optical system according to claim 1; and
an imaging element configured to image an object through the optical system.

15. An on-vehicle system, comprising:
the imaging apparatus according to claim 14; and
a determination unit configured to determine possibility of collision between a vehicle and an object based on distance information on the object acquired by the imaging apparatus.

16. The on-vehicle system according to claim 15, further comprising a control device configured to output a control signal that causes a driving unit of the vehicle to generate braking force in a case where it is determined that there is possibility of collision between the vehicle and the object.

17. The on-vehicle system according to claim 15, further comprising an alarm device configured to issue an alarm to a driver of the vehicle in a case where it is determined that there is possibility of collision between the vehicle and the object.

18. The on-vehicle system according to claim 15, further comprising a notification device configured to notify information about collision between the vehicle and the object to outside.

19. A moving apparatus comprising the imaging apparatus according to claim 14,
wherein the moving apparatus is movable while holding the imaging apparatus.

20. The moving apparatus according to claim 19, further comprising a determination unit configured to determine possibility of collision with the object based on distance information on the object acquired by the imaging apparatus.

* * * * *